United States Patent
Kamatani et al.

(10) Patent No.: US 8,214,197 B2
(45) Date of Patent: Jul. 3, 2012

(54) APPARATUS, SYSTEM, METHOD, AND COMPUTER PROGRAM PRODUCT FOR RESOLVING AMBIGUITIES IN TRANSLATIONS

(75) Inventors: Satoshi Kamatani, Kanagawa (JP); Tetsuro Chino, Kanagawa (JP); Kentaro Furihata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1034 days.

(21) Appl. No.: 11/898,298

(22) Filed: Sep. 11, 2007

(65) Prior Publication Data

US 2008/0077392 A1 Mar. 27, 2008

(30) Foreign Application Priority Data

Sep. 26, 2006 (JP) ................................. 2006-261350

(51) Int. Cl.
G06F 17/28 (2006.01)
G06F 17/20 (2006.01)
G10L 21/00 (2006.01)
(52) U.S. Cl. ..................... 704/2; 704/4; 704/8; 704/277
(58) Field of Classification Search ................. 704/1–10, 704/277
See application file for complete search history.

(56) References Cited

U.S. PATENT DOCUMENTS

| | | | | |
|---|---|---|---|---|
| 5,649,060 A | * | 7/1997 | Ellozy et al. | 704/278 |
| 5,956,668 A | * | 9/1999 | Alshawi et al. | 704/2 |
| 6,278,968 B1 | * | 8/2001 | Franz et al. | 704/3 |
| 6,952,665 B1 | * | 10/2005 | Shimomura et al. | 704/2 |
| 6,999,932 B1 | * | 2/2006 | Zhou | 704/277 |
| 7,080,320 B2 | | 7/2006 | Ono | |
| 7,359,849 B2 | * | 4/2008 | Palmquist | 704/5 |
| 7,539,619 B1 | * | 5/2009 | Seligman et al. | 704/277 |
| 2002/0120436 A1 | * | 8/2002 | Mizutani et al. | 704/2 |
| 2003/0225569 A1 | * | 12/2003 | Shimamura | 704/2 |
| 2004/0243392 A1 | | 12/2004 | Chino et al. | |
| 2006/0173682 A1 | * | 8/2006 | Manabe et al. | 704/246 |
| 2006/0217964 A1 | | 9/2006 | Kamatani et al. | |

(Continued)

FOREIGN PATENT DOCUMENTS

JP 6-236410 8/1994

(Continued)

OTHER PUBLICATIONS

Notice of Rejection issued by the Japanese Patent Office on Jul. 21, 2009, for Japanese Patent Application No. 2006-261350, and Partial English Translation of Office Action.

*Primary Examiner* — Jialong He

(74) *Attorney, Agent, or Firm* — Finnegan, Henderson, Farabow, Garrett & Dunner, L.L.P.

(57) ABSTRACT

A machine translation apparatus includes a translating unit that translates a source language document into a translated document described in a target language, and creates an ambiguous portion that is a word or a sentence having an ambiguity occurred during translation; a storing unit that stores the translated document and the ambiguous portion; a speech receiving unit that receives a speech in the source language; a recognition unit that recognizes the speech received and creates a source language speech sentence as a recognition result; a translation updating unit that updates the translated language document by retranslating a part of a speech content of the source language speech sentence to which the ambiguous portion corresponds, when the source language document includes the ambiguous portion; and a display control unit that displays the updated translated document on a display unit.

11 Claims, 19 Drawing Sheets

U.S. PATENT DOCUMENTS

| | | |
|---|---|---|
| 2006/0224378 A1 | 10/2006 | Chino et al. |
| 2006/0293876 A1 | 12/2006 | Kamatani et al. |
| 2007/0043567 A1* | 2/2007 | Gao et al. .................. 704/257 |
| 2007/0118351 A1* | 5/2007 | Sumita ............................ 704/2 |
| 2007/0198245 A1 | 8/2007 | Kamatani et al. |
| 2008/0249776 A1* | 10/2008 | Busch et al. .................. 704/260 |

FOREIGN PATENT DOCUMENTS

| | | |
|---|---|---|
| JP | 2002-222189 | 8/2002 |

* cited by examiner

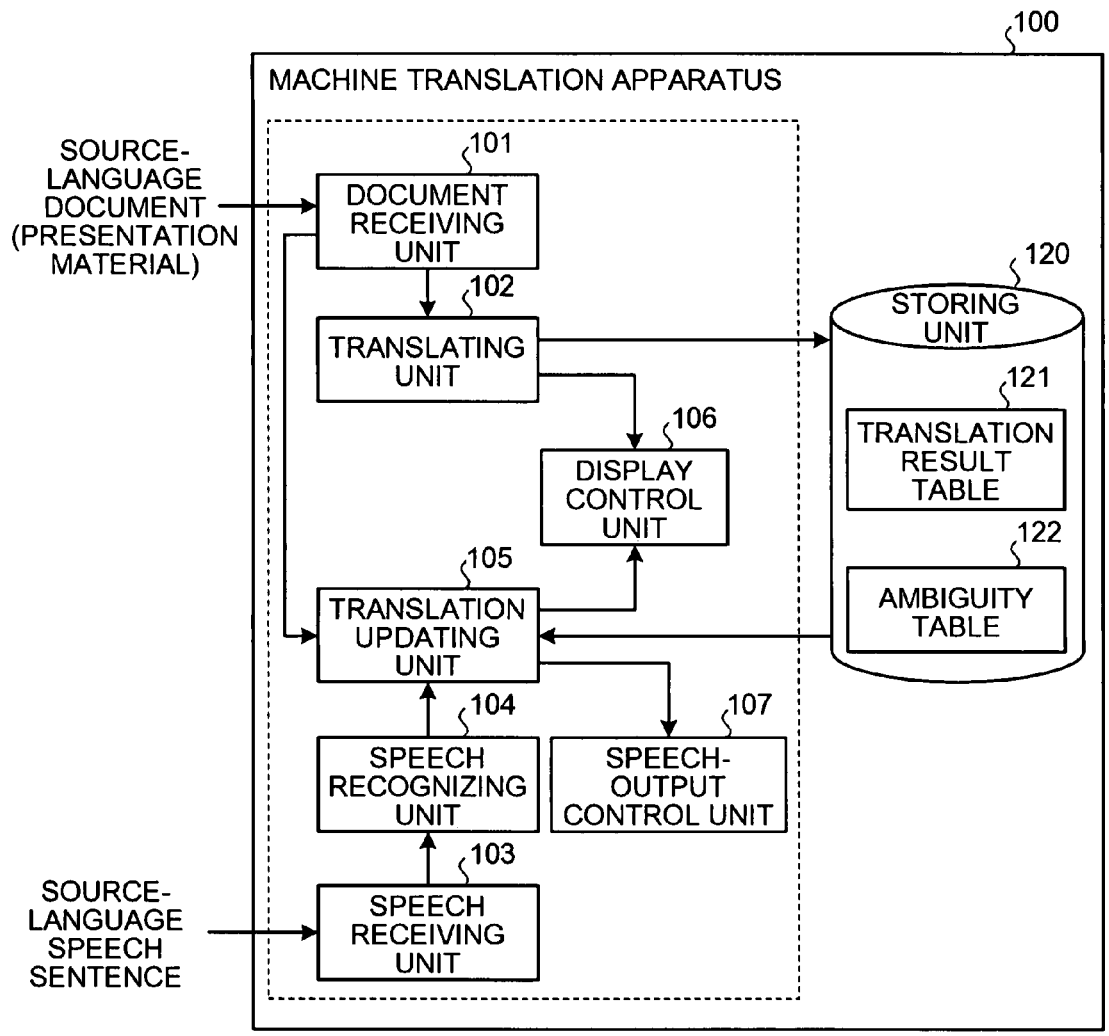

| SENTENCE ID | AMBIGUITY INFORMATION |
|---|---|
| 1 | (TRANSLATION SELECTION, (4, 4), (1, 1)) |
| 10 | (DEPENDENCY, (1, 7), (1, 8)) |
| : | : |

Today , I'll talk about difficulties of processing spoken-language. ⟨902

Difficulties of processing SL ⟨903
⟨901

FIG.10

So , it requires a recognizer with special mechanisms.

It requires special mechanisms for a recognizer.

FIG.14

| TERMINAL ID | SENTENCE ID | AMBIGUITY INFORMATION |
|---|---|---|
| Jpn001 | 1 | (TRANSLATION SELECTION, (4, 4), (1, 1)) |
| Jpn001 | 10 | (DEPENDENCY, (1, 7), (1, 8)) |
| ⋮ | ⋮ | ⋮ |

| 1 | (TRANSLATION SELECTION, (4, 4), (1, 1)) |

| 10 | (DEPENDENCY, (1, 7), (1, 8)) |

So , it requires a recognizer with special mechanisms.

```
Difficulties of processing ⟨SL⟩
• Differ with WL in vocabularies
    - Specific expressions
• Syntactic Ill-formedness
    - Omission
• Disfluency
    - Filler
                                        etc.
⇒
It requires special mechanisms for a recognizer.
```

FIG.27

| Jpn001 | 10 | (DEPENDENCY, (1, 7), (1, 8)) |

APPARATUS, SYSTEM, METHOD, AND COMPUTER PROGRAM PRODUCT FOR RESOLVING AMBIGUITIES IN TRANSLATIONS

CROSS-REFERENCE TO RELATED APPLICATIONS

This application is based upon and claims the benefit of priority from the prior Japanese Patent Application No. 2006-261350, filed on Sep. 26, 2006; the entire contents of which are incorporated herein by reference.

BACKGROUND OF THE INVENTION

1. Field of the Invention

The present invention relates to a method, an apparatus, a system, and a computer program product for machine-translating a document such as conference or lecture material.

2. Description of the Related Art

Recently, information technology (IT) has been commonly used during presentations at conferences and during lectures. For example, electronically created material is distributed to participants or displayed on a screen using a projector. Also, with increasing globalization, international exchanges among people with different languages are frequently held. Furthermore, with the spread of various communication networks such as video phones and Internet protocol (IP) networks, it is anticipated that such international exchanges in which electronically created material is used by people with different languages to communicate will increase in number.

On the other hand, with the development of natural language processing technology, the practical use of a machine translation apparatus that translates a text written in a first language into a second language has been achieved. Therefore, at a conference, even if the conference material is written in the speaker's native language, the speaker can provide conference material translated into the listeners' native languages by using such a machine translation apparatus.

Furthermore, with the development of speech processing technology, the practical use has been achieved of a speech synthesizer that converts natural language character strings as electronic data into speech output, and of a speech input device that converts speech input from a user into character strings and outputs phonetic natural language character strings.

Furthermore, with the integration of natural language processing technology and speech processing technology, an improvement is taking place in the practical use of an interpretation communication support apparatus that is used to support communication among people with different languages. Specifically, the interpretation communication support apparatus can translate not only conference material but also a normative presentation speech into the listeners' native languages. Thus, the interpretation communication support apparatus can provide support to overcome the language barrier among people with different native languages.

As described above, these translation technologies are very useful in helping to foster mutual understanding among people with different native languages in an international exchange such as an international conference or lecture.

However, most conference or lecture materials include only the minimum amount of information because the materials as created are based on a presentation speech and participants' background knowledge. Therefore, even if an interpretive ambiguity occurs in the process of translating the materials, it is difficult to obtain enough information for resolving the ambiguity from the materials. Namely, the machine translation apparatus still has difficulties in translating such conference or lecture materials. This is especially so when translating slides, which are frequently used in presentations in recent years. Moreover, it is inherently difficult to machine-translate materials because ambiguities unique to natural languages exist therein.

To solve the problems, JP-A 2002-222189 (KOKAI) discloses a technology in which headlines of articles in an English newspaper, which have little context, which is also the case with conference materials, are accurately translated into a target language with reference to the content of the articles.

However, even in the technology disclosed in the above document, it is hard to provide a highly accurate translation because descriptions of conference materials are summarized in consideration of a presentation speech in which detailed information is presented and of participants' background knowledge.

SUMMARY OF THE INVENTION

According to one aspect of the present invention, a machine translation apparatus includes a document receiving unit that receives an input of a source language document described in a source language; a translating unit that translates the source language document into a translated document described in a target language and creates an ambiguous portion that is a word or a sentence having an ambiguity that occurred during translation; a storing unit that stores the translated document and the ambiguous portion; a speech receiving unit that receives speech in the source language; a recognition unit that recognizes the speech received by the speech receiving unit and creates a source language speech sentence as a recognition result; a translation updating unit that updates the translated language document stored in the storing unit by retranslating a part of the speech content of the source language speech sentence to which the ambiguous portion corresponds when the source language document includes the ambiguous portion; and a display control unit that displays the translated document updated by the translation updating unit on a display unit.

According to another aspect of the present invention, a machine translation system includes a display apparatus that displays a source language document described in a source language; and a machine translation apparatus that translates the source language document into a translated document described in a target language as a translation result and that is connected to the display apparatus via a network, wherein the machine translation apparatus includes a document receiving unit that receives an input of the source language document; a translating unit that translates the source language document into the translated document and creates an ambiguous portion that is a word or a sentence having an ambiguity that occurred during translation; a storing unit that stores the translated document and the ambiguous portion; a speech receiving unit that receives a speech in the source language; a recognition unit that recognizes the speech received by the speech receiving unit and creates a source language speech sentence as a recognition result; a translation updating unit that updates the translated language document stored in the storing unit by retranslating a part of the speech content of the source language speech sentence to which the ambiguous portion corresponds when the source language document includes the ambiguous portion; a first display control unit that displays the translated document updated by the translation updating unit on a first display unit; and a transmitting unit that transmits the ambiguous portion stored in the storing unit to the display apparatus, and the display apparatus includes a receiving unit that receives the ambiguous portion from the machine translation apparatus; and a second display control unit that displays the source language document on a second display unit, the source language document including information for indicating occurrence of the ambiguous portion where the ambiguity occurs based on the ambiguous portion received by the receiving unit.

According to still another aspect of the present invention, a machine translation method includes receiving an input of a source language document described in a source language; translating the source language document into a translated document described in a target language, and creating an ambiguous portion that is a word or a sentence having an ambiguity that occurred during translation; storing the translated document and the ambiguous portion in a storing unit; receiving a speech in the source language; recognizing the speech and creating a source language speech sentence as a recognition result; updating the translated language document stored in the storing unit by retranslating a part of the speech content of the source language speech sentence to which the ambiguous portion corresponds when the source language document includes the ambiguous portion; and displaying the translated document updated in the updating on a display unit.

A computer program product according to still another aspect of the present invention causes a computer to perform the method according to the present invention.

BRIEF DESCRIPTION OF THE DRAWINGS

FIG. 1 is a block diagram of a machine translation apparatus according to a first embodiment of the present invention;

FIG. 2 is an explanatory diagram showing an example of a translation result table;

FIG. 9 is an explanatory diagram showing an example of a correspondence between a source-language sentence and a source-language speech sentence;

FIG. 10 is an explanatory diagram showing another example of a correspondence between a source-language sentence and a source-language speech sentence;

FIG. 14 is an explanatory diagram showing an example of an ambiguity management table;

FIG. 20 is an explanatory diagram showing an example of an ambiguity table;

FIG. 21 is an explanatory diagram showing an example of a translated document displayed on a translated-document display screen;

FIG. 26 is an explanatory diagram showing an example of display content of a translated document;

FIG. 27 is an explanatory diagram showing an example of the ambiguity management table;

DETAILED DESCRIPTION OF THE INVENTION

Figures 3, 4:
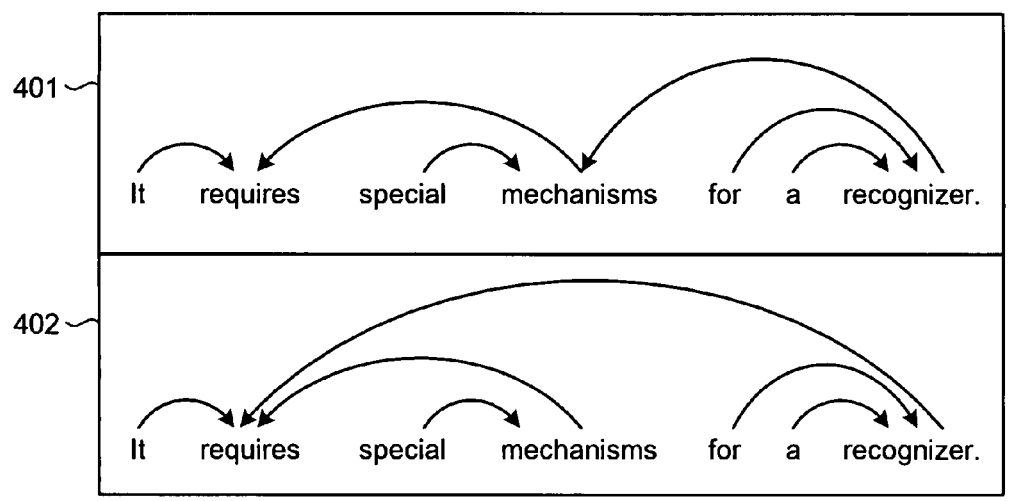
FIG. 3 is an explanatory diagram showing an example of an ambiguity table.
FIG. 4 is an explanatory diagram showing examples for explaining interpretive dependency ambiguities.

Exemplary embodiments of the present invention are explained in detail below with reference to the accompanying drawings. Although a Japanese-English translation and an English-Japanese translation are explained as examples in the embodiments, the present invention can be applied to all languages including, but not limited to, Japanese and English translating target languages.

A machine translation apparatus 100 according to a first embodiment can resolve an ambiguity in translating a document such as conference material by referring to speech content for explaining the conference material, presentation material, and the like.

A unit of character strings separated by, for example, a punctuation mark, an interrogation mark, or an exclamation mark is referred to as a sentence, and a unit of character strings including at least one sentence and in which a topic or a theme is expressed is referred to as a document.

As shown in FIG. 1, the machine translation apparatus 100 includes a storing unit 120, a document receiving unit 101, a translating unit 102, a speech receiving unit 103, a speech recognizing unit 104, a translation updating unit 105, a display control unit 106, and a speech-output control unit 107.

The storing unit 120 is a storage medium such as a hard disk drive (HDD), an optical disk, a memory card, or a random access memory (RAM), and stores therein a translation result table 121 and an ambiguity table 122.

The translation result table 121 stores therein translation results of sentences included in a document, i.e., material. As shown in FIG. 2, a sentence identification (ID) assigned to each of the sentences to uniquely identify the sentences and a translation result are correspondingly stored in the translation result table 121. Incidentally, the material written in English is translated into Japanese in this case.

According to the present embodiment, it is assumed that every single line in the document includes one sentence, and thus a line number that is sequentially assigned to each of the lines is referred to as the sentence ID. However, if it is assumed that each of the lines includes two or more sentences, the sentence ID is assigned to each of the sentences so that the sentences can be uniquely identified.

The ambiguity table 122 stores therein information on ambiguities that occurred in the process of translation. Specifically, as shown in FIG. 3, the sentence ID and ambiguity information that includes the type of ambiguity and positional information on the portion in which the ambiguity occurs are correspondingly stored in the ambiguity table 122.

It is possible to specify types of ambiguities that affect the translation results. The types of ambiguities include, for example, "translation selection" indicating that an ambiguity occurs when a translation of a word included in a sentence is selected, and "dependency" indicating that an ambiguity occurs when dependencies among words included in a sentence are identified.

The positional information of the portion in which an ambiguity occurs is indicated by "(k, l), (m, n)", where "k" and "l" respectively denote a start word position and an end word position of a portion in a source-language sentence in which an ambiguity occurs in the process of translation. For example, if (k, l) is (2, 5), an ambiguity occurs when a portion from the second word to the fifth word in a source-language sentence is translated into a target language. Similarly, "m" and "n" respectively denote a start word position and an end word position of a portion in a translated sentence in which the ambiguity occurs in the process of translation.

The document receiving unit 101 receives an input of a document in text format, such as a presentation or conference material. Any kind of conventional method can be used for inputting the document into the document receiving unit 101. For example, the document receiving unit 101 can receive an input of an electronically-created document via a computer-readable recording medium such as a magnetic tape, a magnetic disk, and an optical disk, or it can download an electronically-created document via a network such as the Internet. Furthermore, if a document is in a format that cannot be received by the document receiving unit 101, such as a paper-based document, the document is converted into an electronic format by an optical character reader (OCR) or the like so that the document receiving unit 101 can receive an input of the document.

Hereinafter, a document received by the document receiving unit 101 is referred to as a source-language document, and each of the sentences included in the source-language document are referred to as a source-language sentence.

The translating unit 102 translates the source-language document received by the document receiving unit 101 into a translated document in a target language. Then, the translating unit 102 stores the translated document as a translation result in the translation result table 121 and also stores ambiguity information on ambiguities that occurred in the process of translation in the ambiguity table 122.

Specifically, the translating unit 102 retrieves each of the source-language sentences from the source-language document, serially translates the retrieved source-language sentence into the target language, and then stores the translated sentence as the translation result together with ambiguity information on an ambiguity that occurred in the translation process of the sentence in the ambiguity table 122. The ambiguity information includes, as described above, the type of ambiguity that occurred in the translation process, the position of the portion in which the ambiguity occurs in the source-language sentence, and the position of the portion in which the ambiguity occurs in the translated sentence.

For example, when an English sentence "Difficulties of processing SL" is translated into Japanese, it is assumed that a translation of a word "SL" is considered any one of five Japanese words denoting "source language", "spoken-language", "salvage loss", "sea level", and "symbolic language". In this case, the translating unit 102 outputs a Japanese translation of "source language", which is the first cited word, as a default.

Then, the ambiguity occurs due to a plurality of selections of the Japanese translation of the word "SL", and thus the translating unit 102 specifies "translation selection" as the type of the ambiguity and outputs "(translation selection, (4, 4), (1, 1))" as the ambiguity information indicating that both a start position and an end position of the word "SL" are the fourth word in the English sentence and also both a start position and an end position of the Japanese translation denoting the word "SL" are the first word in the translated sentence.

In a case in which an English sentence "It requires special mechanisms for a recognizer." is translated into Japanese, it is assumed that two patterns of interpretive dependency ambiguities occur in the process of translation (see FIG. 4).

In an interpretation 401, it is interpreted that "a recognizer" depends on "special mechanism" as indicated by an arrow. Incidentally, dependency relations among words are indicated by arrows as shown in FIG. 4.

In an interpretation 402, it is interpreted that "a recognizer" depends on "requires" as indicated by an arrow.

In this case, the translating unit 102 selects the interpretation 401, which is the first cited interpretation, as a default, and specifies "dependency" as the type of the ambiguity, and outputs "(dependency, (1, 7), (1, 8))" as the ambiguity information indicating that a start position and an end position of the portion in which ambiguity occurs are respectively the first word and the seventh word in the English sentence and also a start position and an end position in the Japanese translation corresponding to the portion are respectively the first word and the eighth word in the translated sentence.

Any kind of method employed in a machine translation system can be applied to the translation process performed by the translating unit 102. For example, the transfer method, the example-based method, the statistics-based method, and the interlingua method are applicable to the translation process. Also, to detect ambiguities, it is possible to employ a generally-used method, for example, the morphological analysis with using an A* algorithm, the parsing analysis such as the Earley parsing method, the chart parsing method, and the generalized LR parsing method, or the context analysis and the discourse analysis those based on Shank's scripts or the discourse representation theory.

The speech receiving unit 103 receives a speech input from a user via a microphone (not shown), and samples analogue signals of the input speech, and converts the sampled analogue signals into stereo digital signals, and then outputs the stereo digital signals. For example, conventional analog-to-digital (ND) conversion technology can be applied to the above process performed by the speech receiving unit 103.

The speech recognizing unit 104 performs speech recognition processing with respect to the speech received by the speech receiving unit 103 and outputs the speech in text format. Incidentally, the speech recognizing unit 104 can perform the speech recognition processing by a generally used speech recognition method using, for example, linear predictive coding (LPC) analysis or a hidden Markov model (HMM). Hereinafter, the text output by the speech recognizing unit 104 is referred to as a source-language speech sentence.

In the embodiment, the speech is converted into text format by the speech receiving unit 103 and the speech recognizing unit 104. Alternatively, the content of the speech (the source-language speech sentence) can be directly input to the machine translation apparatus via a keyboard or a mouse, or it is also possible to transcribe content of the speech into a source-language speech sentence in the same manner as the document receiving unit 101 and input the transcribed source-language speech sentence to the machine translation apparatus.

The translation updating unit 105 translates the source-language speech sentence into a translated sentence written in a target language resolves an ambiguity that occurred in the process of translating the source-language speech sentence into the translated document with reference to the translated sentence and the ambiguity information stored in the ambiguity table 122, and then updates the translation result table 121 with the translated document in which the ambiguity is resolved.

Specifically, the translation updating unit 105 translates the source-language speech sentence received by the speech receiving unit 103, and resolves the ambiguity that occurred in the process of translation by corresponding the source-language speech sentence with a source-language sentence in the source-language document received by the document receiving unit 101. Then, the translation updating unit 105 reflects the resolved ambiguity in the translated document output by the translating unit 102 and updates the ambiguity table 122.

Figure 5:
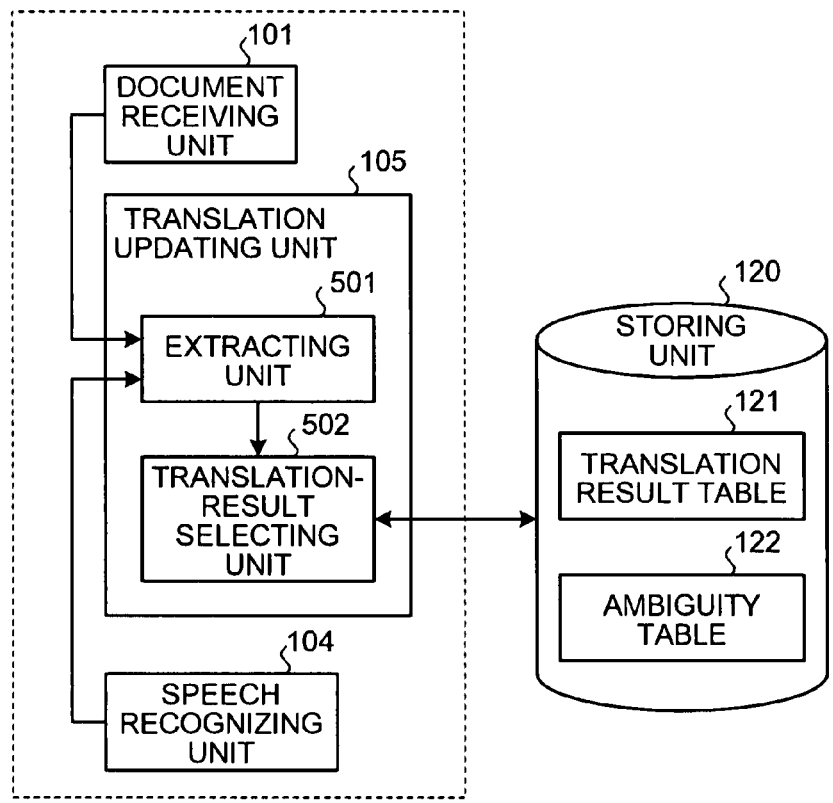
FIG. 5 is a block diagram explaining the translation updating unit shown in FIG. 1.

As shown in FIG. 5, the translation updating unit 105 includes an extracting unit 501 and a translation-result selecting unit 502.

The extracting unit 501 extracts one of the source-language sentences that is most similar to the source-language speech sentence received by the speech receiving unit 103 from the source-language document received by the document receiving unit 101.

Specifically, the extracting unit 501 executes a first alignment process that estimates which range of the source-language document corresponds to the received source-language speech sentence. A unit of the range is, for example, on the basis of each slide in the case where slides are the presentation material or on the basis of each chapter or on the basis of each clause where the conference material includes chapters.

The extracting unit 501 narrows down the range for detecting a source-language sentence as a final output of the extracting unit 501, which is most similar to the source-language speech sentence, to a range of a portion of a speech content that is currently explained by a speaker. Thus, the extracting unit 501 can correspond the source-language sentence with the source-language speech sentence with high speed and high precision.

In the first alignment process, phrases used when a slide or topic is shifted to the following one, for example, "next", "well", and "next showing", are stored in a memorizing unit (not shown) as keywords in advance so that the shifting to the following slide or topic can be easily detected by keyword matching between the stored phrases and phrases included in the speaker's speech. Also, conventional correspondence technologies can be applied to the first alignment process. For example, a similarity between a speech and a text is calculated so that a correspondence relation having a maximum amount of similarity can be dynamically detected by using dynamic programming or the like. Furthermore, it is also possible to set a currently displayed slide or location at the time in which the speaker's speech is input as a corresponding position.

Furthermore, the accuracy of the first alignment process can be improved by adding positional information such as a page number that is indicated to listeners by a speaker's speech or a pointer (not shown) and by detecting a keyword indicating a position, for example, "I'll talk about section 3 in chapter 3." from the speech.

Specifically, the extracting unit 501 detects a keyword representing information on a range of a document such as page, chapter, clause, and paragraph from the source-language speech sentence by keyword matching with those words stored in the memorizing unit (not shown) in advance and specifies the range of the source-language document corresponding to the detected keyword. Then, the extracting unit 501 extracts a source-language sentence from the specified range.

Subsequently, the extracting unit 501 executes a second alignment process in which the source-language speech sentence corresponds to one of the source-language sentences included in the range estimated in the first alignment process that is most similar to the source-language speech sentence.

In the present embodiment, with respect to each of the source-language sentences included in the range estimated in the first alignment process, all similarities between words included in each of the source language sentences and words included in the source-language speech sentence are calculated by following Equation (1), to output one of the source-language sentences that has a maximum amount of the sentence similarity SIMs.

$$SIMs(M, N) = \sum_{i}^{m} \mathrm{argmax}_{j}(SIMw(w_i, w_j)) \quad (1)$$

However, if an amount of the sentence similarity SIMs is below a threshold, it is determined that there is no source-language sentence corresponding to the source-language speech sentence. Therefore, the second alignment process is terminated as a failure.

Incidentally, in Equation (1), reference symbol "M" denotes the source-language speech sentence, "N" denotes the source-language sentence included in the range estimated in the first alignment process, "wi" denotes an i-th phrase included in M, "wj" denotes a j-th phrase included in N, and "m" demotes the number of phrases included in M. Reference symbol "SIMw(wi,wj)" denotes a function for calculating a similarity between words. The similarity between words can be obtained by any kind of conventional method of calculating the similarity between words, for example, a method of calculating a distance between thesaurus-arranged concepts.

By the above processes, the source-language speech sentence corresponds to one of the source-language sentences included in the received source-language document that is most similar to the source-language speech sentence, and the correspondence between the source-language sentence and the source-language speech sentence is obtained on the basis of the similarity between words included in the source-language sentence and words included in the source-language speech sentence.

The translation-result selecting unit 502 reselects a translation result based on the alignment result obtained by the extracting unit 501, thereby resolving ambiguity stored in the ambiguity table 122. For example, when the type of the ambiguity is "translation selection", the translation-result selecting unit 502 preferentially reselects a translation of a word included in the source-language speech sentence that corresponds to the source-language sentence on the basis of the alignment result obtained by the extracting unit 501. On the other hand, when the type of the ambiguity is "dependency", the translation-result selecting unit 502 prioritizes the dependency employed in the analysis of the source-language speech sentence and selects an analysis result of the source-language sentence.

The display control unit 106 displays the translation result of the source-language document on a display screen (not shown) by indicating a portion in which the translation ambiguity occurs with reference to the translated sentence of the source-language sentence and the ambiguity table 122 stored in the storing unit 120. Specifically, the display control unit 106 indicates the portion in which the ambiguity occurs by enclosing it in angle brackets "<" and ">".

The speech-output control unit 107 synthesizes the translated speech sentence as the translation result of the source-language speech sentence to a speech, and outputs the synthesized speech. The speech-output control unit 107 can perform the speech synthesis processing by using any kind of conventional method, for example, the speech synthesis by the compilation of speech segments, formant-based speech synthesis, corpus-based speech synthesis, and text-to-speech synthesis.

The speech-output control unit 107 can output in combination with any kind of conventional output method, for example, a method of outputting a text translated into a target language on a display unit such as a display screen and a method of outputting a sentence translated into the target language to a printer or the like by text printing. Those output methods can be used instead of the speech-output control unit 107.

Figure 6:
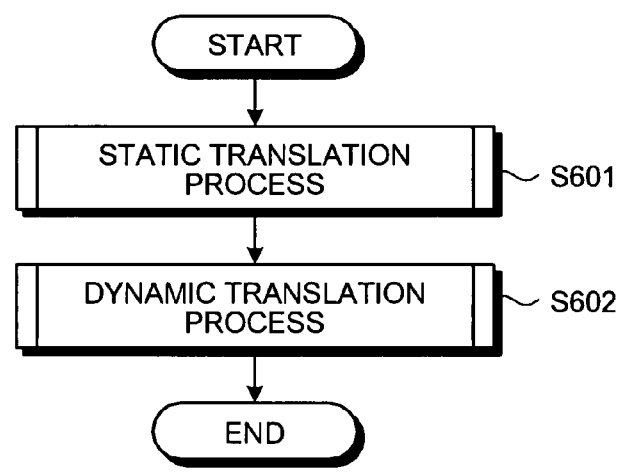
FIG. 6 is a flowchart of a machine translation process performed by the machine translation apparatus according to the first embodiment.

A machine translation process performed by the machine translation apparatus 100 according to the first embodiment is described below with reference to FIG. 6.

First, a static translation process is performed to translate the received source-language document in text format (step S601). Then, a dynamic translation process is performed to resolve an ambiguity that occurred in the static translation process with reference to the source-language speech sentence that is provided for explaining the source-language document (step S602). The static translation process and the dynamic translation process are described in detail below. The static translation process performed by the machine translation apparatus 100 is described in detail below with reference to FIG. 7.

The document receiving unit 101 receives an input of a source-language document Ds (step S701). The translating unit 102 retrieves one-line information Ws from the source-language document Ds (step S702). In other words, the translating unit 102 retrieves one source-language sentence at step S702, because in the present embodiment, it is assumed that each of the lines in the document includes one sentence only.

The translating unit 102 translates the one-line information Ws, and outputs ambiguity information Wa and a translated sentence Wt of the one-line information Ws (step S703). If no ambiguity occurs in the process of translation at step S703, the ambiguity information Wa is not output.

The translating unit 102 reflects the translated sentence Wt in a translated document Dt (step S704). In other words, the translated sentence Wt in the translated document Dt is output as a portion corresponding to the one-line information Ws.

The translating unit 102 determines whether the ambiguity information Wa is output (step S705). If the ambiguity information Wa is not output (NO at step S705), the translating unit 102 retrieves one-line information Ws of the following line (step S702), and the system control proceeds to step S703.

If the ambiguity information Wa is output (YES at step S705), the translating unit 102 stores the ambiguity information Wa in the ambiguity table 122 (step S706).

The translating unit 102 determines whether all the lines in the source-language document Ds are processed (step S707). If all the lines are not processed yet (NO at step S707), the translating unit 102 retrieves one-line information Ws of the following line from the source-language document Ds (step S702). The system control proceeds to step S703.

If all the lines are processed (YES at step S707), the display control unit 106 performs a translated-document display process, i.e., displays the translated document Dt on a display unit (not shown) (step S708). Then, the static translation process is terminated.

The dynamic translation process performed by the machine translation apparatus 100 is described in detail below with reference to FIG. 8.

The translation updating unit 105 retrieves the translated document Dt from the translation result table 121 (step S801). The speech receiving unit 103 receives an input of a source-language speech sentence Ss (step S802).

The translation updating unit 105 outputs a translated speech sentence Ts as a translation result of the source-language speech sentence Ss (step S803). The extracting unit 501 executes the first alignment process that estimates which range of the source-language document Ds corresponds to the source-language speech sentence Ss (step S804).

The extracting unit 501 executes the second alignment process that extracts a source-language sentence Sa corresponding to the translated speech sentence Ts from the range estimated in the first alignment process (step S805). Specifically, the extracting unit 501 extracts the source-language sentence Sa that is most similar to the translated speech sentence Ts from the range estimated in the first alignment process by calculating with Equation (1). By the process, a correspondence between words included in the source-language sentence Sa and words included in the source-language speech sentence Ss is determined.

For example, as shown in FIG. 9, "Difficulties of processing SL" as the source-language sentence Sa corresponds to "Today, I'll talk about difficulties of processing spoken-language." as the source-language speech sentence Ss. The correspondences between words included in the source-language sentence Sa and words included in the source-language speech sentence Ss are indicated by solid lines. In this case, a word 901 included in the source-language sentence Sa ("SL") in which an ambiguity occurs corresponds to a word 902 included in the source-language speech sentence Ss ("spoken-language") as indicated by a solid line 903.

As shown in FIG. 10, "It requires special mechanisms for a recognizer." as the source-language sentence Sa corresponds to "So, it requires a recognizer with special mechanisms." as the source-language speech sentence Ss.

The translation updating unit 105 determines whether the source-language sentence Sa is extracted (step S806). As described above, if the sentence similarity SIMs is below a threshold, no source-language sentence Sa may be extracted.

If the source-language sentence Sa is extracted (YES at step S806), the translation updating unit 105 determines whether any record stored in the ambiguity table 122 (hereinafter, "ambiguity record" relating to the source-language sentence Sa is stored in the ambiguity table 122 (step S807). Specifically, the translation updating unit 105 determines whether an ambiguity record with a sentence ID corresponding to a sentence ID (line number) of the source-language sentence Sa is stored in the ambiguity table 122.

If any ambiguity record relating to the source-language sentence Sa is stored in the ambiguity table 122 (YES at step S807), the translation-result selecting unit 502 retranslates the source-language sentence Sa with reference to the translation result of the source-language speech sentence Ss and outputs a translated sentence Ta (step S808).

For example, it is assumed that an ambiguity occurs in translating the word "SL" included in the source-language sentence Sa and five translation candidates of the word "SL" are stored in the ambiguity table 122. When it is determined that "SL" is an abbreviation of "spoken-language" based on the translation of the source-language speech sentence Ss, the translation-result selecting unit 502 performs a retranslation process and selects "spoken-language" as the translation of the word "L".

In a case in which the same ambiguity occurs in a plurality of portions of the source-language document Ds, when the ambiguity occurred in one of the portions is resolved, the ambiguity occurred in the other portions can also be resolved automatically.

The translation updating unit 105 deletes the ambiguity record corresponding to the resolved ambiguity from the ambiguity table 122 (step S809). Then, the translation updating unit 105 replaces the translated sentence of the source-language sentence Sa by the translated sentence Ta and updates the translation result table 121 (step S810).

The display control unit 106 performs the translated-document display process, i.e., displays the updated translated document Dt on the display unit (not shown) (step S811).

If it is determined that the source-language sentence Sa is not extracted at step S806 (NO at step S806), or if it is determined that no ambiguity record relating to the source-language sentence Sa is stored in the ambiguity table 122 at step S807 (NO at step S807), or after the display control unit 106 displays the translated document Dt on the display unit (step S811), the speech-output control unit 107 outputs a synthesized speech of the translated speech sentence Ts to a speech output unit (not shown) such as a speaker (step S812).

The translation updating unit 105 determines whether the source-language speech sentence Ss is over, i.e., whether the explanation of the material such as slides is finished (step S813). If the source-language speech sentence Ss is not over (NO at step S813), the system control proceeds to step S802. If the source-language speech sentence Ss is over (YES at step S813), the dynamic translation process is terminated.

Figure 11:
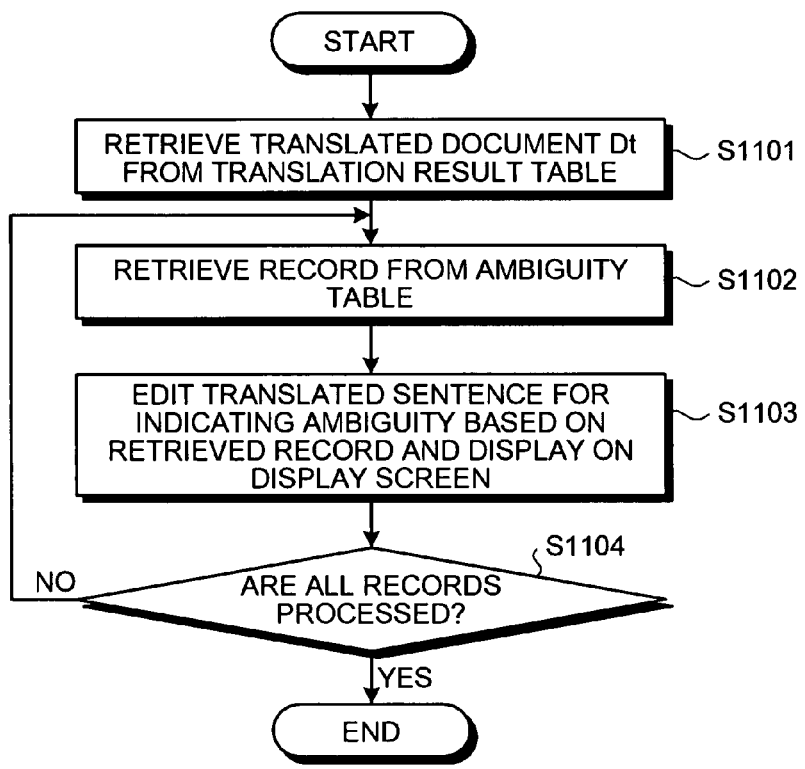
FIG. 11 is a flowchart of a translated-document display process performed by the machine translation apparatus according to the first embodiment.

The translated-document display process in steps S708 and S811 is described in detail below with reference to FIG. 11.

The display control unit 106 retrieves the translated document Dt from the translation result table 121 (step S1101). Then, the display control unit 106 retrieves one of the ambiguity records from the ambiguity table 122 (step S1102).

The display control unit 106 edits the translated sentence for indicating the occurrence of the ambiguity based on the retrieved ambiguity record, and displays on a translated-document display screen (step S1103). Specifically, the display control unit 106 encloses a portion of the translated sentence in which the ambiguity occurs in angle brackets "<" and ">" with reference to the positional information of the portion in which the ambiguity occurs that is included in the ambiguity record, and displays on the translated-document display screen as shown in FIG. 12.

Figure 12:
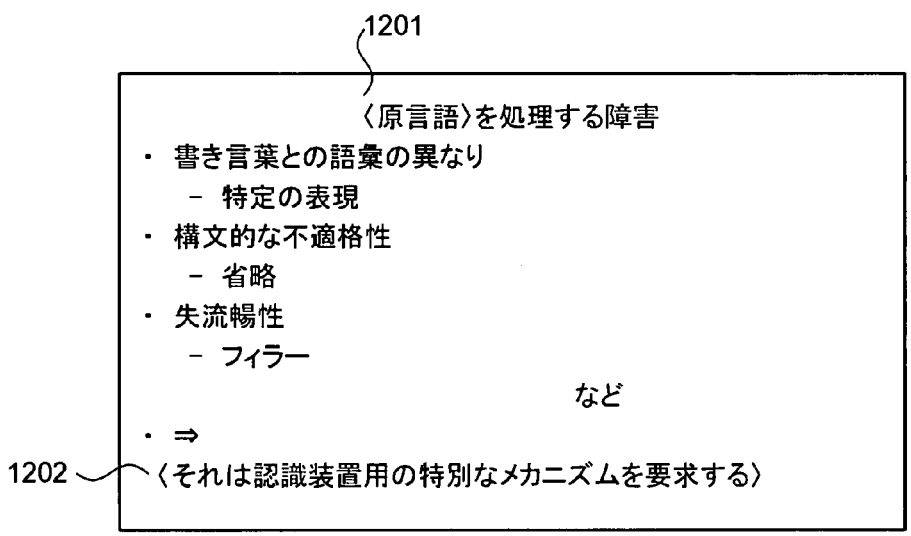
FIG. 12 is an explanatory diagram showing an example of a translated document displayed on a translated-document display screen.

In the translated document in Japanese shown in FIG. 12, an ambiguity occurs in a portion of a Japanese word 1201 as enclosed in angle brackets "<" and ">". Also, a dependency ambiguity occurs in a portion of a Japanese sentence 1202 as enclosed in angle brackets "<" and ">".

In this manner, a portion in which an ambiguity occurs in the process of translation can be indicated by using a mark. Thus, it is possible to bring attention to listeners. Incidentally, the mark is not limited to angle brackets "<" and ">". Alternatively, the portion can be indicated by other marks, the underline, or changing a font color.

Moreover, it is also possible to use different marks depending on types of ambiguities. In addition, it is possible to add detailed information on the ambiguity, for example, content of the ambiguity or other translation candidates into the portion indicated by using the mark.

After the translated sentence is displayed on the translated-document display screen (step S1103), the display control unit 106 determines whether all the ambiguity records are processed (step S1104). If all the ambiguity records are not processed yet (NO at step S1104), the system control proceeds to step S1102.

As described above, the machine translation apparatus 100 according to the first embodiment can resolve an ambiguity occurred in translating, for example, a conference material with reference to a speech content for explaining the conference material, a presentation material, and the like. Thus, even if the conference material includes the minimum amount of content, the machine translation apparatus 100 can translate the conference material with high precision.

Furthermore, the machine translation apparatus 100 can dynamically correspond speech content to content included in the material in accordance with the progress of the speech, and update translated content in synchronization with the dynamic correspondence. Therefore, the machine translation apparatus 100 can obtain the latest translation result, and thus can support listeners to understand a speaker's intention correctly.

In general, a speaker just hands out a conference material on participants, and rarely translates his speech into native languages of all the listeners, i.e., the participants. In most cases, the participants respectively prepare a translation apparatus to translate the conference material by themselves. Therefore, the speaker normally does not recognize the translation result of the conference material. Even when the speaker provides the translation of the conference material to the listeners, the quality of the translation is not always guaranteed because the speaker may not have sufficient knowledge of the listeners' native languages. Thus, it is difficult to correct or fill in the gaps in a variance between the speaker's intention and the listeners' understandings or the translation of the material.

In a machine translation apparatus disclosed in JP-A 2002-222189 (KOKAI), a speaker can not recognize a translation result of a material that is translated into a listener's native language, and thus the speaker can not provide an appropriate explanation for filling in the gaps of the listener's knowledge. As a result, the machine translation apparatus according to the conventional technology can not achieve the mutual understanding between the speaker and the listener.

A machine translation system according to a second embodiment can display portions in which ambiguities occur in the process of translating a conference material or the like, so that a speaker can recognize the occurrence of the ambiguities. Therefore, the speaker can provide an appropriate explanation for filling in the gaps in a variance of a speaker's intention.

Figure 13:
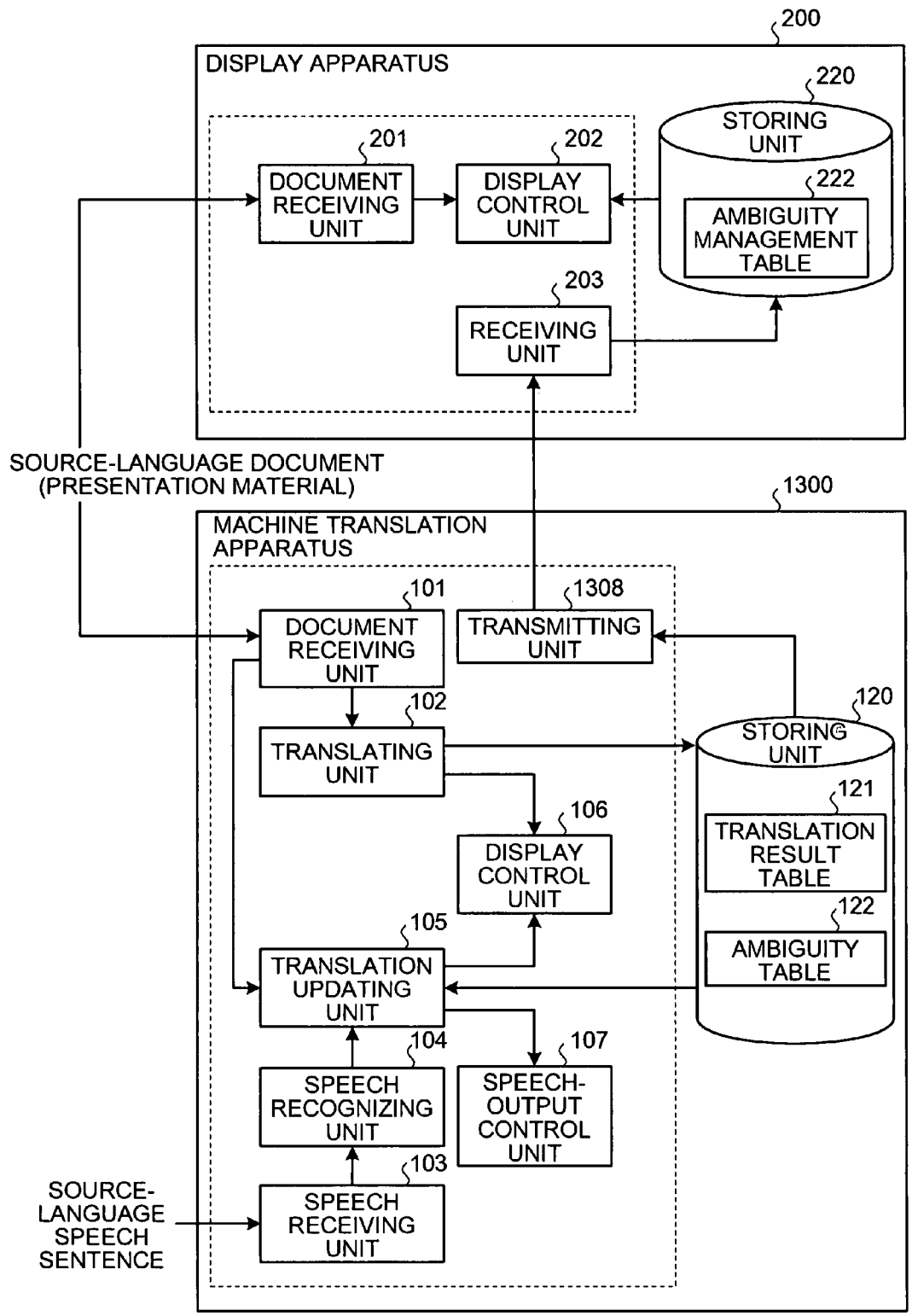
FIG. 13 is a block diagram of a machine translation system according to a second embodiment of the present invention.

As shown in FIG. 13, the machine translation system according to the second embodiment includes a machine translation apparatus 1300 and a display apparatus 200. Only one number of the machine translation apparatus 1300 is included in the machine translation system shown in FIG. 13, but a plurality of the machine translation apparatuses can be connected to the display apparatus 200.

The display apparatus 200 is used by a user, i.e., a speaker, and displays thereon not a translation result of a source-language document but the source-language document as it is to show the speaker of the source-language document. An ordinary computer, for example, a personal computer including a display unit can be used as the display apparatus 200.

As shown in FIG. 13, the display apparatus 200 includes a storing unit 220, a document receiving unit 201, a display control unit 202, and a receiving unit 203.

The storing unit 220 is a storage medium such as an HDD, an optical disk, a memory card, or a RAM, and stores therein an ambiguity management table 222 with respect to each of the machine translation apparatuses connected to the display apparatus 200.

The ambiguity management table 222 includes ambiguity information on ambiguities occurred in the process of translation. As shown in FIG. 14, a terminal ID that uniquely identifies each of the machine translation apparatuses connected to the display apparatus 200, the sentence ID, and the ambiguity information are correspondingly stored in the ambiguity management table 222.

In other words, the ambiguity management table 222 stores therein records in which the terminal ID and each of the ambiguity records stored in the ambiguity table 122 included in the machine translation apparatus 1300 are correspondingly stored (hereinafter, "ambiguity management records").

Even when a plurality of listeners' terminals (the machine translation apparatuses) are connected to the display apparatus 200, the ambiguity management records can be managed by types of ambiguities because the terminal ID and the ambiguity record are correspondingly stored in the ambiguity management table 222. Namely, if an ambiguity occurred in one of the listeners' terminals is resolved, and also if the same ambiguity occurred in the other listeners' terminals is not resolved, information on the ambiguity can be appropriately managed without deleting the information in case it is wrongly determined that the ambiguity is resolved.

The document receiving unit 201 receives information on a document in text format such as a presentation material or a conference material. The document receiving unit 201 has the same function as the document receiving unit 101 included in the machine translation apparatus 1300.

The display control unit 202 displays thereon a source-language document in which a portion in which a translation ambiguity occurs is indicated with reference to the source-language document received by the document receiving unit 201 and the ambiguity management table 222 stored in the storing unit 220. The display control unit 202 indicates the portion in which the translation ambiguity occurs, in the same manner as the display control unit 106 according to the first embodiment, by enclosing the portion in angle brackets "<" and ">".

The receiving unit 203 receives an ambiguity record transmitted from a transmitting unit 1308 in the machine translation apparatus 1300. The communication between the receiving unit 203 and the transmitting unit 1308 can be made by any kinds of communication methods, for example, a wired local area network (LAN), a wireless LAN, or the Internet.

Upon receiving the ambiguity record, the receiving unit 203 stores the ambiguity record together with the terminal ID unique to the machine translation apparatus 1300 as a transmitting source in the ambiguity management table 222. Incidentally, the terminal ID is transmitted from the machine translation apparatus 1300 to the receiving unit 203.

The machine translation apparatus 1300 includes the storing unit 120, the document receiving unit 101, the translating unit 102, the speech receiving unit 103, the speech recognizing unit 104, the translation updating unit 105, the display control unit 106, the speech-output control unit 107, and the transmitting unit 1308.

Difference between the machine translation apparatus 1300 and the machine translation apparatus 100 is that the machine translation apparatus 1300 further includes the transmitting unit 1308. The portions identical to those in FIG. 1 are denoted with the same reference numerals and the description of those portions is omitted.

When a source-language document is translated into a translated document, the transmitting unit 1308 transmits the ambiguity record stored in the ambiguity table 122 to the receiving unit 203 in the display apparatus 200.

A machine translation process performed by the machine translation apparatus 1300 is described below. Incidentally, the overall machine translation process performed by the machine translation apparatus 1300 is identical to that is performed by the machine translation apparatus 100 as shown in FIG. 6, and thus the description is omitted.

Figure 15:
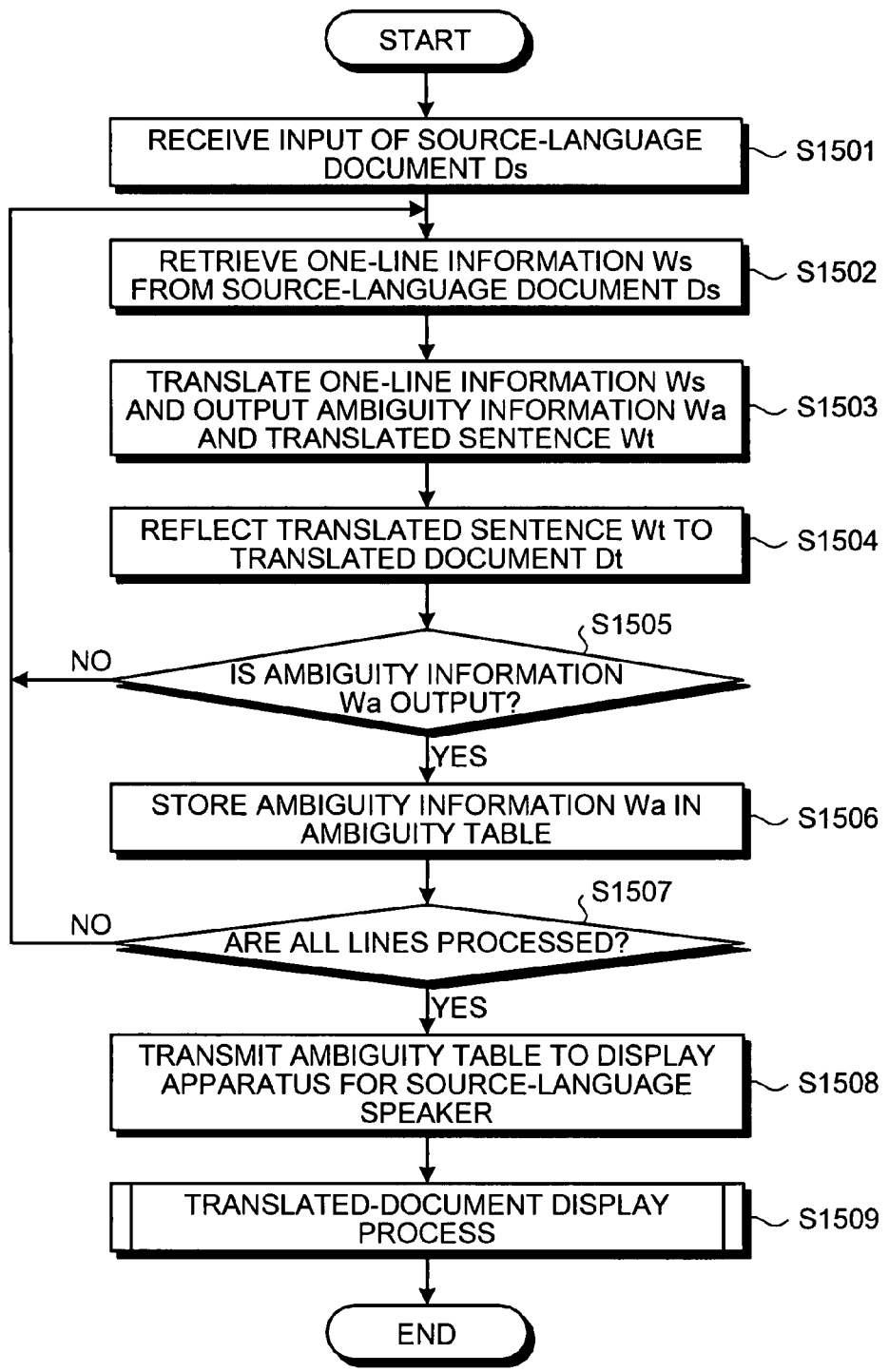
FIG. 15 is a flowchart of a static translation process performed by a machine translation apparatus according to the second embodiment.

A static translation process performed by the machine translation apparatus 1300 is described in detail below with reference to FIG. 15.

Figure 7:
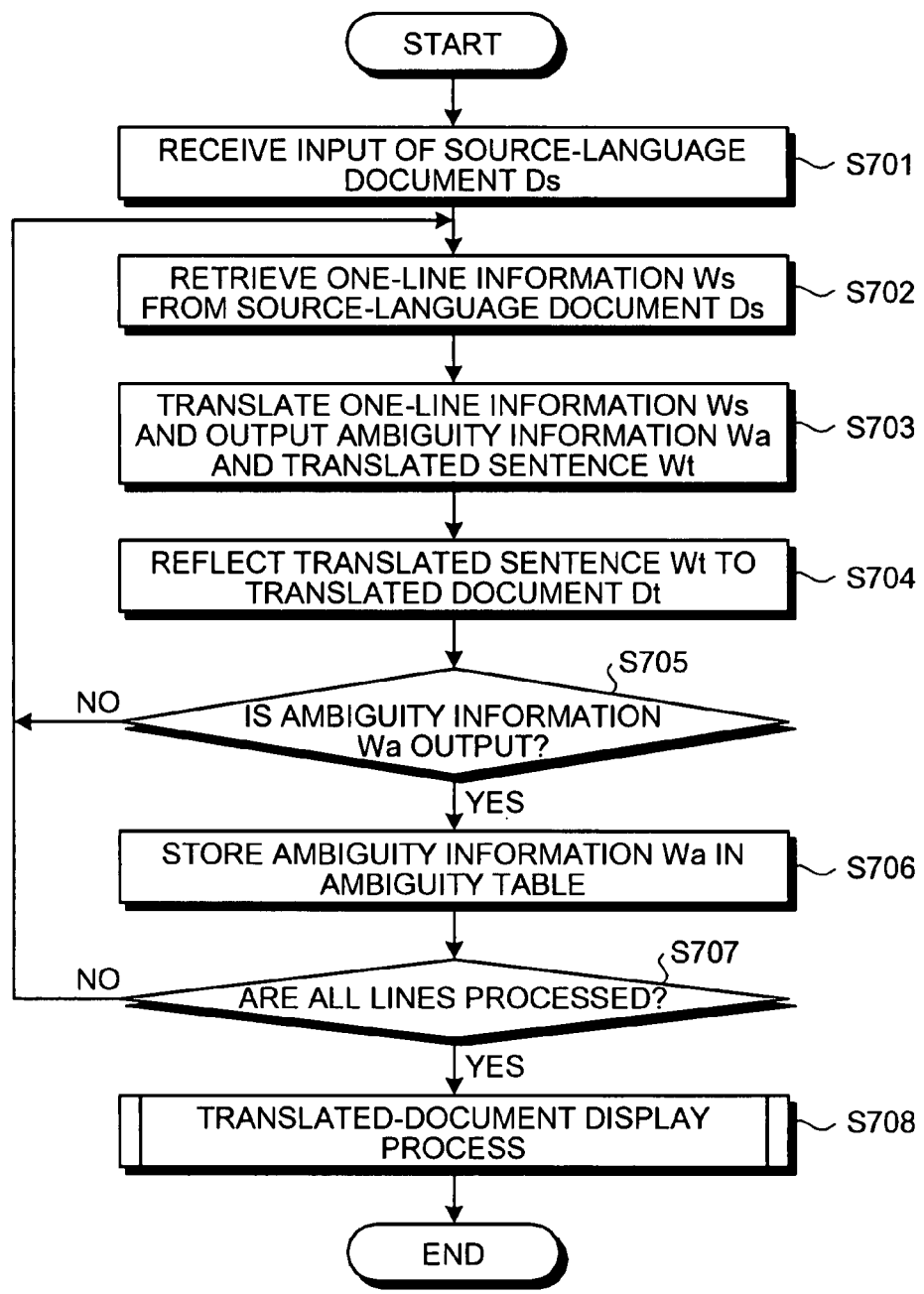
FIG. 7 is a flowchart of a static translation process performed by the machine translation apparatus according to the first embodiment.

Portions in steps S1501 to S1507 are identical to those in steps S701 to S707 shown in FIG. 7, and the description of those portions is omitted.

If it is determined that all the lines are processed (YES at step S1507), the transmitting unit 1308 transmits an ambiguity record stored in the ambiguity table 122 to the display apparatus 200 for the source language speaker (step S1508).

The display control unit 106 performs a translated-document display process, i.e., displays the translated document Dt on the display unit (not shown) (step S1509), and then the static translation process is terminated.

Figure 16:
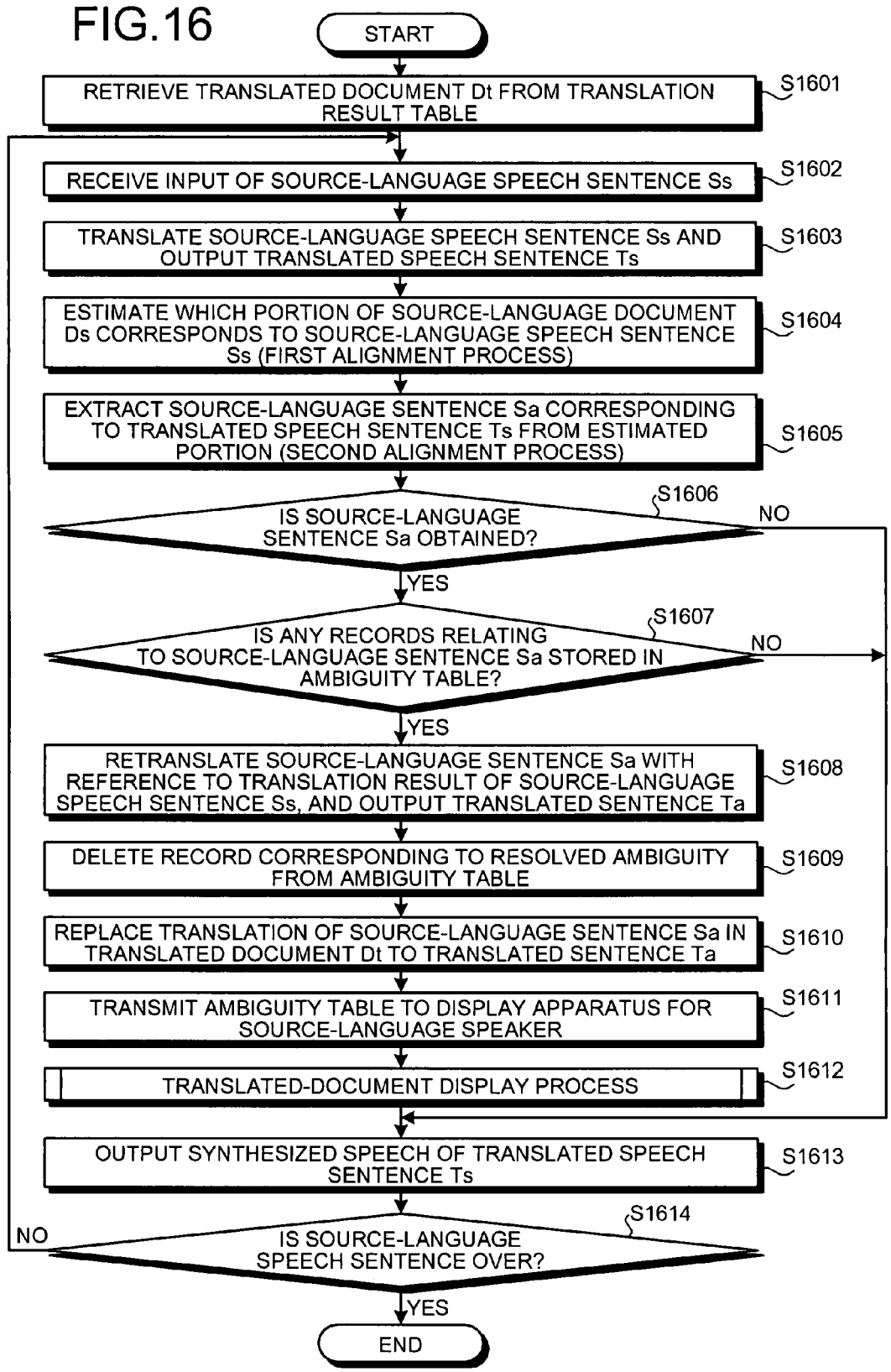
FIG. 16 is a flowchart of a dynamic translation process performed by the machine translation apparatus according to the second embodiment.

A dynamic translation process performed by the machine translation apparatus 1300 is described in detail below with reference to FIG. 16.

Figure 8:
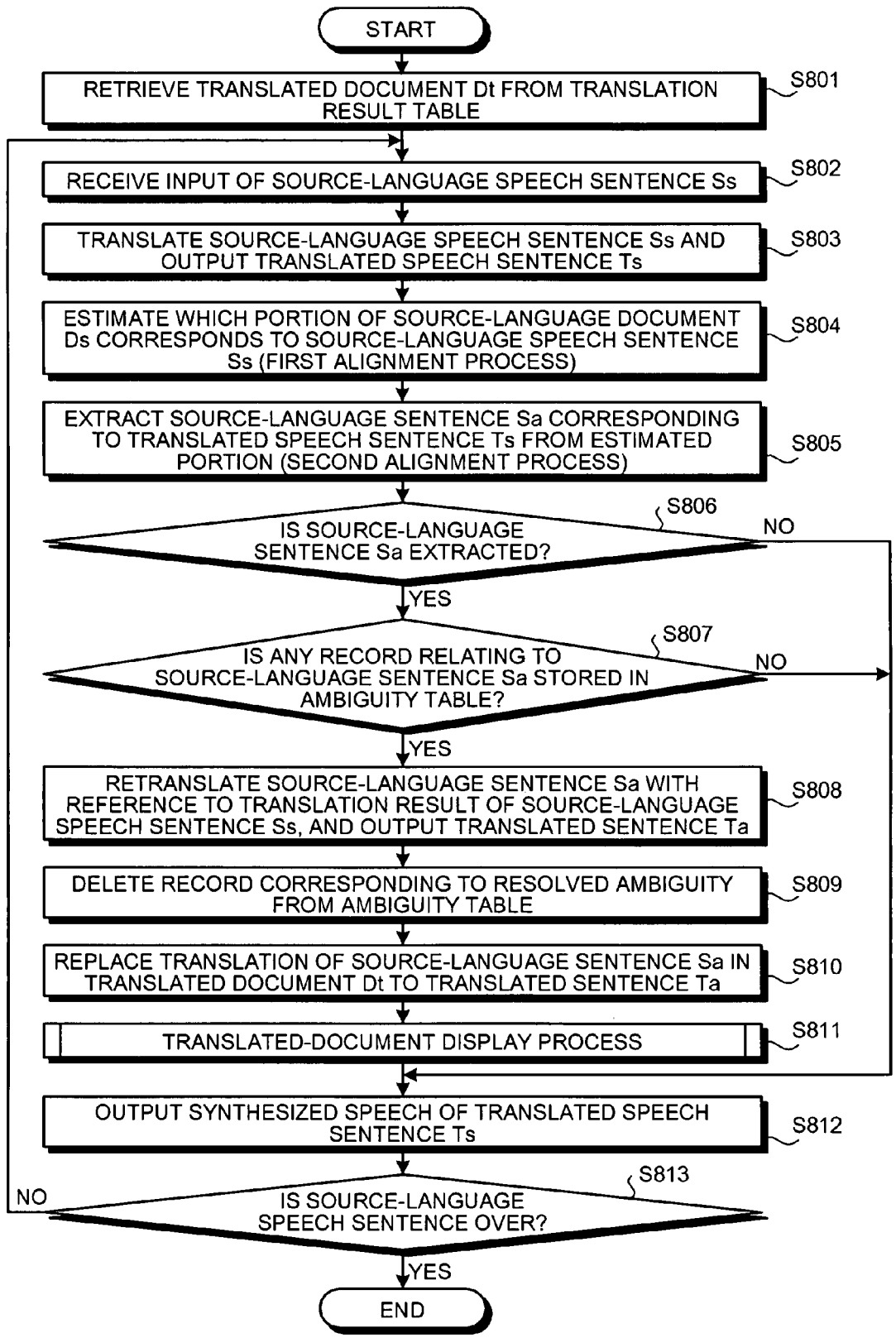
FIG. 8 is a flowchart of a dynamic translation process performed by the machine translation apparatus according to the first embodiment.

Portions in steps S1601 to S1610 are identical to those in steps S801 to S810 shown in FIG. 8, and the description of those portions is omitted.

After the translation updating unit 105 replaces the translated sentence (step S1610), the transmitting unit 1308 transmits the ambiguity record stored in the ambiguity table 122 to the display apparatus 200 for the source language speaker (step S1611).

Portions in steps S1612 to S1614 are identical to those in steps S811 to S813 shown in FIG. 8, and the description of those portions is omitted.

In the second embodiment, as described above, whenever the static translation process is performed and the ambiguity table 122 is updated in the dynamic translation process, the ambiguity record stored in the ambiguity table 122 is transmitted to the display apparatus 200. Therefore, it is possible to notify the display apparatus 200 of an occurrence of the ambiguity. Thus, the display apparatus 200 can automatically edit display content with reference to the notified content.

Figure 17:
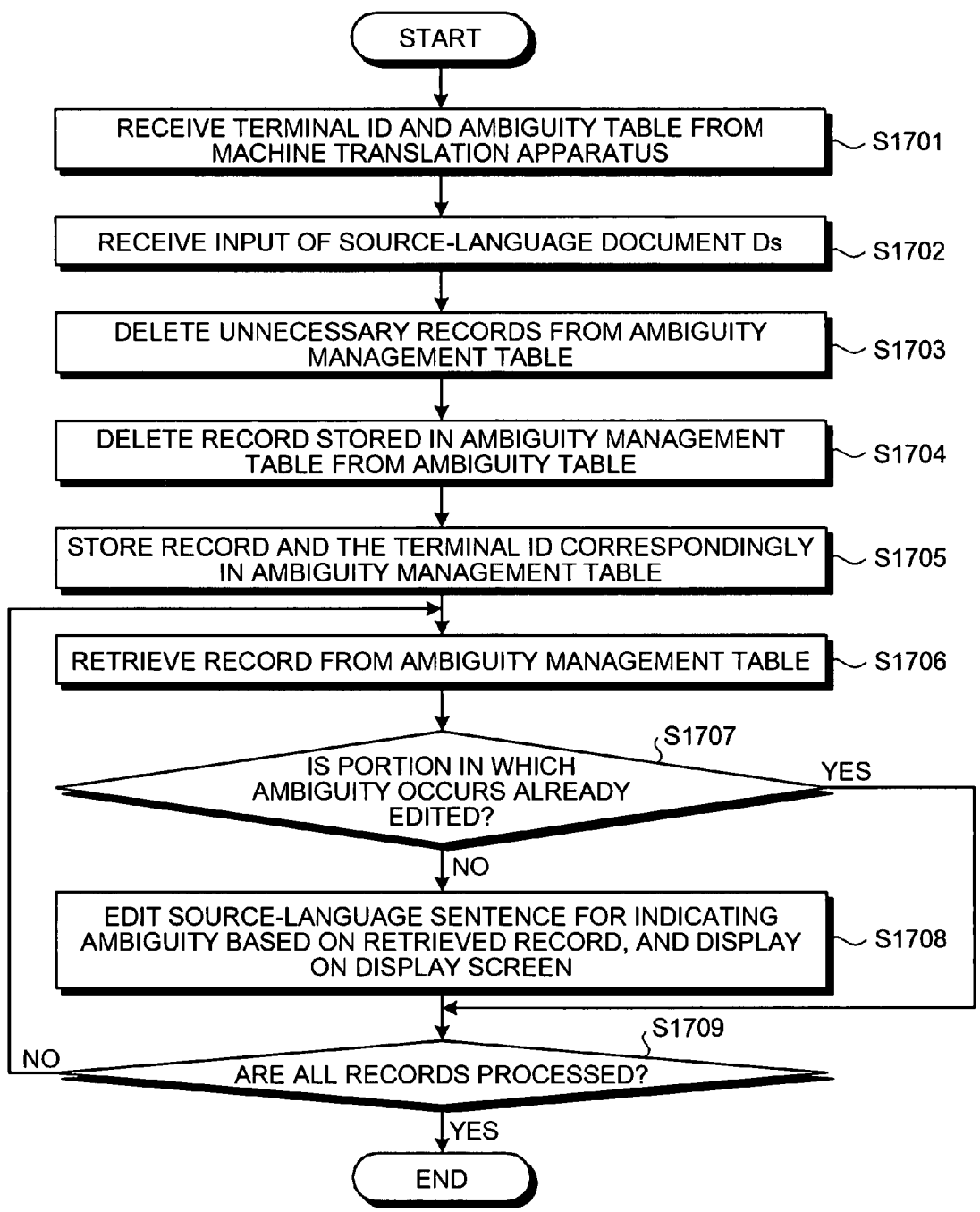
FIG. 17 is a flowchart of a source-language document display process performed by the machine translation system according to the second embodiment.

A source-language document display process performed by the display apparatus 200 is described below with reference to FIG. 17. In the source-language document display process, the display apparatus 200 displays thereon a source-language document in which display content is edited with reference to the ambiguity information stored in the ambiguity management table 222.

The receiving unit 203 receives the terminal ID and the ambiguity table 122 from the machine translation apparatus 1300 (step S1701). The document receiving unit 201 receives an input of the source-language document Ds (step S1702).

The display control unit 202 deletes unnecessary ambiguity management records from the ambiguity management table 222 (step S1703). Specifically, the display control unit 202 deletes ambiguity management records those having the same terminal ID with the received terminal ID and also having content that does not correspond to that is stored in the ambiguity table 122 from the ambiguity management table 222.

If the machine translation apparatus 1300 as the transmitting source resolves the ambiguity, the ambiguity record corresponding to the ambiguity is deleted from the ambiguity table 122. Then, the ambiguity table 122 is transmitted to the display apparatus 200. In this case, the ambiguity management record corresponding to the deleted ambiguity record is still stored in the ambiguity management table 222 in the display apparatus 200, and thus the ambiguity management record is detected by obtaining a difference between the ambiguity record and the ambiguity management record, and then the detected ambiguity management record is deleted from the ambiguity management table 222.

The display control unit 202 deletes the ambiguity record that has been stored in the ambiguity management table 222 from the ambiguity table 122 (step S1704). Therefore, it is possible to prevent the ambiguity management table 222 from storing the overlapped ambiguity record. Specifically, the display control unit 202 deletes ambiguity records those having both the same terminal ID and the same ambiguity information from the ambiguity management table 222.

The display control unit 202 stores the ambiguity record and the terminal ID correspondingly in the ambiguity management table 222 (step S1705).

In this manner, the ambiguity management table 222 can be created with storing therein the latest ambiguity information to which the received ambiguity record is reflected.

The display control unit 202 retrieves one of ambiguity management records from the ambiguity management table 222 (step S1706). Then, the display control unit 202 determines whether a portion corresponding to positional information on a position in which the ambiguity occurs, which is included in the retrieved ambiguity management record, is already edited (step S1707).

If the portion is not edited yet (NO at step S1707), the display control unit 202 edits a source-language sentence corresponding to the portion, which is included in the source-language document Ds, for indicating the occurrence of the ambiguity, and then displays the edited source-language document Ds on a source-language document display screen (step S1708). Specifically, the display control unit 202 encloses the portion in angle brackets "<" and ">" with reference to the positional information corresponding to the portion in the ambiguity management record, and displays the edited source-language document Ds on the source-language document display screen as shown in FIG. 18.

Figure 18:
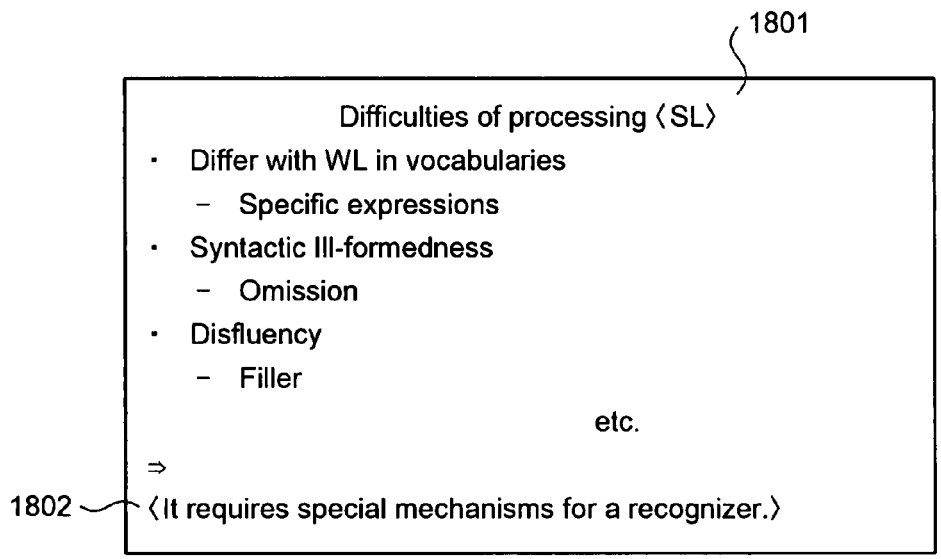
FIG. 18 is an explanatory diagram showing an example of a source-language document displayed on a source-language document display screen.

In a case of the source-language document Ds shown in FIG. 18, an ambiguity occurs in translating an English word 1801 enclosed in angle brackets "<" and ">", and also a dependency ambiguity occurs in an English sentence 1802 enclosed in angle brackets "<" and ">".

Therefore, not only listeners but also the speaker as the source language speaker can recognize the portion in which the ambiguity occurs in the process of translation. Thus, the speaker can explain the portion to resolve the ambiguity. As a result, it is possible to reduce the possibility of causing the variance between the speaker's intention and listeners' understandings.

If it is determined that the portion corresponding to the positional information is already edited (YES at step S1707), or after the edited source-language document Ds is displayed on the source-language document display screen (step S1708), the display control unit 202 determines whether all the ambiguity management records are processed (step S1709).

If all the ambiguity management records are not processed yet (NO at step S1709), the system control proceeds to step S1706. If all the ambiguity management records are processed (YES at step S1709), the source-language document display process is terminated.

The machine translation process performed by the machine translation apparatus 1300 is described in detail below with reference to FIGS. 19 to 29.

It is assumed that a slide as a conference material is electronically distributed to participants. Also, it is assumed that a speaker is a native speaker of English and uses a speaker's terminal (the display apparatus 200) to which "Eng001" as the terminal ID is assigned, and a listener is a native speaker of Japanese and uses a listener's terminal (the machine translation apparatus 1300) to which "Jpn001" as the terminal ID is assigned.

Figure 19:
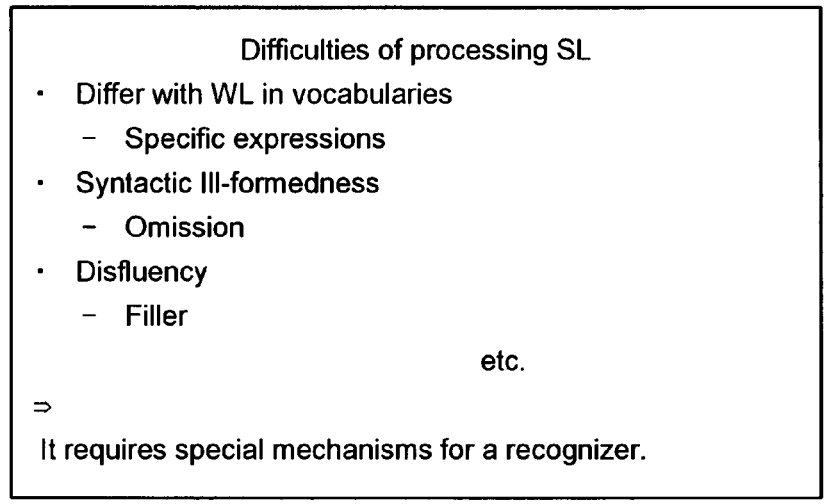
FIG. 19 is an explanatory diagram showing another example of the source-language document displayed on the source-language document display screen.

When the slide as shown in FIG. 19 is input to the listener's terminal Jpn001, the static translation process is performed (step S601). In other words, the slide is statically translated into a prespecified language that is set by a user of the terminal Jpn001 (the listener), i.e., translated into Japanese in this case.

In the static translation process, the input slide is processed as the source-language document Ds (step S1501). Information on the first line of the source-language document Ds: "Difficulties of processing SL" is read out as the one-line information Ws of the source-language document Ds (step S1502).

As a result of translating the one-line information Ws, the translating unit 102 outputs "(translation selection, (4, 4), (1, 1))" as the ambiguity information and a Japanese translation denoting "Difficulties of processing a source language" as the translated sentence Wt (step S1503).

The translating unit 102 reflects content of the translated sentence Wt to the translated document Dt (step S1504). An ambiguity occurs in the process of translation (YES at step S1505), and thus the translating unit 102 stores information on line number to specify a sentence, which is included in the source-language document Ds, in which the ambiguity occurs and ambiguity information Wa correspondingly in the ambiguity table 122 (step S1506). FIG. 20 is an explanatory diagram showing an example of the ambiguity table 122 after the above process is performed.

Then, the translating unit 102 reads out information on the second line of the source-language document Ds: "Differ with WL in vocabularies" as the one-line information Ws (step S1502).

As a translation result of the one-line information Ws, it is assumed that the translating unit 102 outputs a Japanese translation denoting "Differ with a written language in vocabularies" as the translated sentence Wt (step S1503). In this case, the translating unit 102 outputs no ambiguity information because no ambiguity occurs in translating the second line.

The translating unit 102 reflects content of the translated sentence Wt to the translated document Dt (step S1504), and the system control proceeds to step S1502 because no ambiguity occurs in the process of translation (NO at step S1505).

In this manner, the system control repeatedly proceeds those steps until information on the last line of the source-language document Ds: "It requires special mechanisms for a recognizer." is translated by the translating unit 102. After the above process is performed, the ambiguity table 122 is, for example, in a status as shown in FIG. 3.

When the translation process of the source-language document Ds is terminated, the ambiguity table 122 in which the ambiguity information on ambiguities occurred in the process of translation is completely stored is transmitted to the speaker's terminal (step S1508). A state at this time is referred to as an intermediate state 1.

The display control unit 106 performs a translated-document display process (step S1509). The display control unit 106 retrieves the translated document Dt created in the static translation process from the translation result table 121 (step S1101). Then, the display control unit 106 retrieves the first ambiguity record from the ambiguity table 122 shown in FIG. 3. Namely, the display control unit 106 retrieves the first ambiguity record: "sentence ID=1, ambiguity information= (translation selection, (4, 4), (1, 1))" from the ambiguity table 122 (step S1102).

According to the first ambiguity record, an ambiguity occurs in the first line of the source-language document Ds, and the ambiguity affects the first word of the translated sentence. Therefore, the display control unit 106 encloses a portion in which the ambiguity occurs in angle brackets "<" and ">" (step S1103). FIG. 21 is an explanatory diagram showing an example of display content of the translated document Dt after the above process is performed.

The other ambiguity records included in the ambiguity table 122 are processed in the same manner as the first ambiguity record. After processing all the ambiguity records included in the ambiguity table 122, the translated document Dt is displayed, for example, as shown in FIG. 12.

The machine translation system according to the present embodiment can indicate the listener a portion in which an ambiguity occurs in the process of translation, for example, the Japanese word 1201 denoting "<a source language>" or the Japanese sentence 1202 denoting "<It requires special mechanisms for a recognizer.>" shown in FIG. 12. Thus, it is possible to bring attention to the listener.

After the static translation process is terminated, the dynamic translation process is performed (step S602).

The translated document Dt output by the translating unit 102 is retrieved from the translation result table 121 (step S1601). It is assumed that the speech receiving unit 103 receives "Today, I'll talk about difficulties of processing spoken-language." as the source-language speech sentence Ss (step S1602). Also, it is assumed that the translation updating unit 105 translates the source-language speech sentence Ss into Japanese and outputs a Japanese translation denoting "Today, I'll talk about difficulties of processing spoken-language." as the translated speech sentence Ts.

Then, the extracting unit 501 executes the alignment process to correspond the source-language speech sentence Ss to a source-language sentence included in the source-language document Ds (steps S1604 and S1605). It is assumed that "Difficulties of processing SL", which is a sentence of the first line of the source-language document shown in FIG. 19, is extracted as the corresponding source-language sentence Sa. FIG. 9 depicts an example of an alignment result at this time.

It is determined that the alignment process is successful because the source-language sentence Sa is obtained (YES at step S1606), and thus the system control proceeds to step S1607. The obtained source-language sentence Sa as an alignment destination is included in the first line of the source-language document Ds, and also the first ambiguity record on the ambiguity corresponding to the source-language sentence Sa is stored in the ambiguity table 122 shown in FIG. 3 (YES at step S1607). Thus, the system control proceeds to step S1608.

In this case, as the alignment result shown in FIG. 9, the word 901: "SL" included in the source-language sentence Sa corresponds to the word 902: "spoken-language" included in the source-language speech sentence Ss. The type of the ambiguity occurred in the source-language sentence Sa is translation selection of "SL". It is assumed that five Japanese translations denoting "source language", "spoken-language", "salvage loss", "sea level", and "symbolic language" are obtained as translation candidates of the word "SL".

It is assumed that "spoken-language", which is corresponded to "SL" by the alignment process, is uniquely determined, and thus the translation-result selecting unit 502 uniquely selects a Japanese translation denoting "spoken-language" from the translation candidates so that the two words corresponding to each other can be translated into the same translation.

Therefore, it is possible to resolve the ambiguity in the translation selection that is occurred in the process of translating the source-language sentence Sa and also to obtain a new translated sentence Ta to which the uniquely-selected translation is reflected (step S1608).

Figures 22, 23:
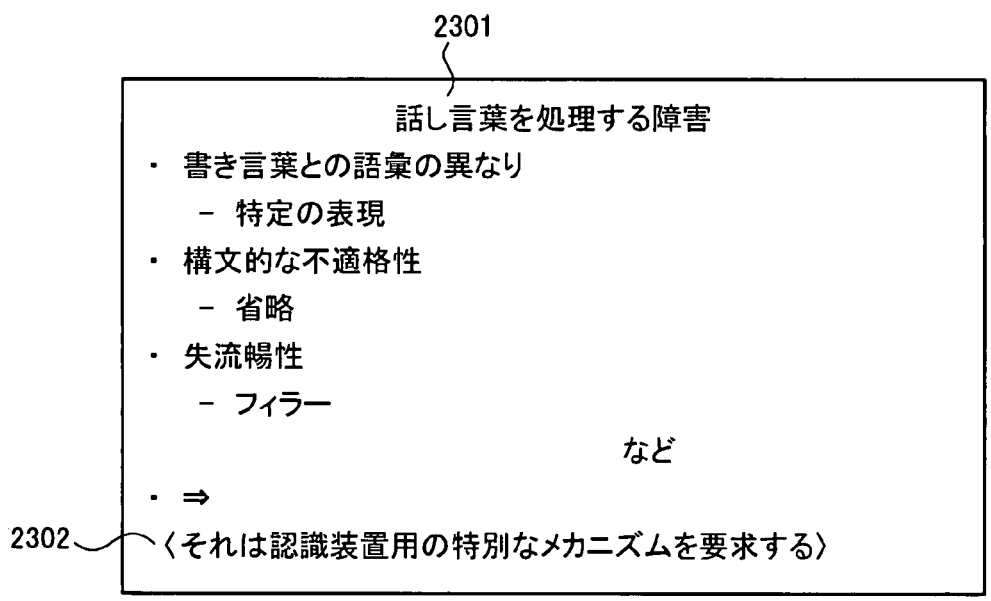
FIG. 22 is an explanatory diagram showing an example of an ambiguity table.
FIG. 23 is an explanatory diagram showing another example of the translated document displayed on the translated-document display screen.

When the ambiguity is resolved as described above, the first ambiguity record (see FIG. 3) corresponding to the resolved ambiguity is deleted from the ambiguity table 122 (step S1609). At the same time, the newly-obtained translated sentence Ta is reflected in the translated document Dt (step S1610). FIG. 22 is an explanatory diagram showing an example of the updated ambiguity table 122.

The updated ambiguity table 122 is transmitted to the speaker's terminal (step S1611). The state at this time is referred to as an intermediate state 2.

The translated-document display process is performed. FIG. 23 is an explanatory diagram showing an example of display content of the translated-document display screen in the translated-document display process.

On the translated-document display screen after the static translation process is performed, it is indicated that an ambiguity has occurred in the word 1201 (see FIG. 12). On the other hand, as shown in FIG. 23, a word 2301 corresponding to the word 1201 is displayed with a correct Japanese translation, which is denoted as "spoken-language" on the translated-document display screen. Namely, the speaker's intention is correctly reflected in the Japanese translation, and also it is indicated that the ambiguity that occurred in the process of translation is resolved on the listener's terminal side.

As described above, the machine translation system according to the present embodiment can correctly resolve the ambiguity that occurred in the process of translation and also can resolve the variance between the speaker's intention and the listener's understanding.

After the translated-document display process is performed, the speech-output control unit 107 outputs synthesized speech of the translated speech sentence Ts (step S1613), and then the system control proceeds to step S1614.

It is assumed that speech is further input to the speech receiving unit 103 (NO at step S1614) and the speech receiving unit 103 receives "Of course, as you know, there are several difficulties" as the source-language speech sentence Ss (step S1602).

It is assumed that the translation updating unit 105 translates the source-language speech sentence Ss into Japanese and outputs a Japanese translation denoting "Of course, as you know, there are several difficulties." as the translated speech sentence Ts (step S1603).

Then, the extracting unit 501 executes the alignment process so as the source-language speech sentence Ss corresponds to a source-language sentence included in the source-language document Ds (steps S1604 and S1605). If no corresponding source-language sentence is obtained from the source-language document Ds, it is assumed that no source-language sentence Sa exists. Therefore, it is determined that the alignment process fails (NO at step S1606), and a speech-synthesis output process is performed (step S1613).

As described above, even when new speech is obtained, if the input of the speech does not contribute to resolving an ambiguity, the process for resolving the ambiguity is not performed. Thus, it is possible to prevent the translated document Dt from being updated incorrectly.

It is assumed that speech is further input to the speech receiving unit 103 (NO at step S1614) and the speech receiving unit 103 receives "It requires a recognizer with special mechanisms" as the source-language speech sentence Ss (step S1602).

It is assumed that the translation updating unit 105 translates the source-language speech sentence Ss into Japanese and outputs a Japanese translation denoting "It requires a recognizer with special mechanisms" as the translated speech sentence Ts (step S1603).

Then, the extracting unit 501 executes the alignment process so as the source-language speech sentence Ss corresponds to a source-language sentence included in the source-language document Ds (steps S1604 and S1605). If it is assumed that "It requires special mechanisms for a recognizer", which is a sentence in the tenth line of the source-language document Ds as shown in FIG. 19, is extracted as the corresponding source-language sentence Sa. 122 this time, the alignment result indicates, for example, what is shown in FIG. 10.

If it is determined that the alignment process is successful because the source-language sentence Sa is obtained (YES at step S1606), the system control proceeds to step S1607. The obtained source-language sentence Sa as an alignment destination is included in the tenth line of the source-language document Ds, and also the ambiguity record on the ambiguity corresponding to the source-language sentence Sa is stored in the ambiguity table 122 shown in FIG. 22 (YES at step S1607). Thus, the system control proceeds to step S1608.

According to the ambiguity record shown in FIG. 22, a dependency ambiguity occurs in the source-language sentence Sa in the process of translation. It is assumed that the ambiguity can be interpreted in two ways as, indicated in the interpretations 401 and 402 shown in FIG. 4.

In the interpretation 401, "a recognizer" is interpreted as depending on "special mechanism". In the interpretation 402, "a recognizer" is interpreted as depending on "requires". In the static translation process, the interpretation 401 is selected.

Figures 24, 25:
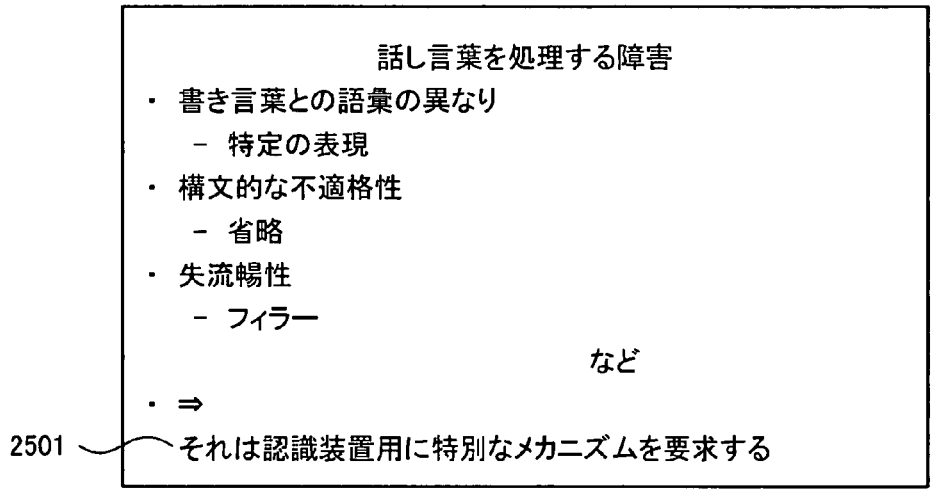
FIG. 24 is an explanatory diagram showing an example explaining a dependency structure.
FIG. 25 is an explanatory diagram showing another example of the translated document displayed on the translated-document display screen.

On the other hand, it is assumed that a dependency structure is uniquely determined when the translation updating unit 105 translates the source-language speech sentence Ss into Japanese. FIG. 24 is an explanatory diagram showing an example of the uniquely-determined dependency structure. The example indicates that the interpretation 402 is to be preferentially selected. Therefore, it is determined that the source-language sentence Sa is also preferentially interpreted as well as the interpretation 402.

Therefore, it is possible to resolve the ambiguity in the dependency interpretation that has occurred in the process of translation and also to obtain a new translated sentence Ta in which the uniquely-determined dependency interpretation is reflected (step S1608).

The ambiguity is resolved as described above, and thus the ambiguity record on the resolved ambiguity (see FIG. 22) is deleted from the ambiguity table 122 (step S1609). At the same time, the newly-obtained translated sentence Ta is reflected in the translated document Dt (step S1610). At this time, all the ambiguities that occurred in the source-language document Ds in the static translation process are resolved, and thus the status of the ambiguity table 122 stored in the listener's terminal returns to an empty set.

The ambiguity table 122 that has a status that has returned to the empty set is transmitted to the speaker's terminal (step S1611). The state at this time is referred to as an intermediate state 3.

The translated-document display process is performed. FIG. 25 is an explanatory diagram showing an example of display content displayed on the translated-document display screen in the translated-document display process.

The display content shown in FIG. 23 indicates a sentence 2302 in which an ambiguity occurs. On the other hand, in the case of the display content shown in FIG. 25, a sentence 2501 in which the dependency is correctly interpreted is indicated. In other words, the speaker's intention is correctly reflected in the sentence 2501. Also, the listener can recognize that the ambiguity that occurred in the process of translation is resolved.

The translated-document display process is described below with a definite example. The translated-document display process is performed whenever the ambiguity table 122 is transmitted from the listener's terminal.

First, there is described a process in which the ambiguity table 122 shown in FIG. 3 is transmitted from the listener's terminal to the speaker's terminal in the intermediate state 1. However, it is assumed that a status of the ambiguity management table 222 stored in the speaker's terminal has been an empty set until the speaker's terminal receives the ambiguity table 122 as shown in FIG. 3.

The speaker's terminal first receives "Jpn001" as the terminal ID of a transmitting source and the ambiguity table 122 as shown in FIG. 3 (step S1701). Then, the speaker's terminal receives an input of the source-language document Ds (step S1702).

Here, no ambiguity management record is stored in the ambiguity management table 222, and thus all the ambiguity records included in the received ambiguity table 122 are stored together with the corresponding terminal ID in the ambiguity management table 222 (steps S1703 to S1705).

As shown in FIG. 14, the ambiguity management table 222 stores therein two ambiguity management records. Therefore, the first ambiguity management record: "terminal ID=Jpn001, sentence ID=1, ambiguity information=(translation selection, (4, 4), (1, 1))" is retrieved from the ambiguity management table 222.

The first ambiguity management record indicates that an ambiguity occurs in the first line of the source-language document Ds and the fourth word in the source-language sentence is affected by the ambiguity. Therefore, the display control unit 106 encloses a portion in which the ambiguity occurs in angle brackets "<" and ">". FIG. 26 is an explanatory diagram showing an example of display content of the translated document Dt after the above process is performed.

The other ambiguity management records are processed in the same manner as the first ambiguity management record. After processing all the ambiguity management records in the ambiguity management table 222, the translated document Dt is displayed, for example, as shown in FIG. 18.

As described above, the machine translation system according to the present embodiment can indicate the speaker a portion in which an ambiguity occurs in the process of translation. For example, the speaker can recognize that ambiguities occur in the word 1801: "<SL>" and the sentence 1802: "<It requires special mechanisms for a recognizer.>" shown in FIG. 18. Thus, it is possible to bring attention to the speaker.

There is described a process in which the ambiguity table 122 as shown in FIG. 22 is transmitted from the listener's terminal to the speaker's terminal in the intermediate state 2. It is assumed that the ambiguity management table 222 stores therein the ambiguity management records as shown in FIG. 14.

The speaker's terminal first receives "Jpn001" as the terminal ID of the listener's terminal as a transmitting source and the ambiguity table 122 as shown in FIG. 22 (step S1701). Then, the speaker's terminal receives an input of the source-language document Ds (step S1702).

Of the ambiguity management records having the terminal ID "Jpn001" those stored in the ambiguity management table 222 shown in FIG. 14, the first ambiguity management record is deleted because the first ambiguity management record does not correspond to any of the ambiguity records in the received ambiguity table 122 (step S1703).

Then, the ambiguity record shown in FIG. 22, which corresponds to the ambiguity management record stored in the ambiguity management table 222, is deleted from the ambiguity table 122 (step S1704). As a result, a status of the received ambiguity table 122 returns an empty set, and thus there is no ambiguity record to be added into the ambiguity management table 222 (step S1705). FIG. 27 is an explanatory diagram showing an example of the ambiguity management table 222.

Figure 28:
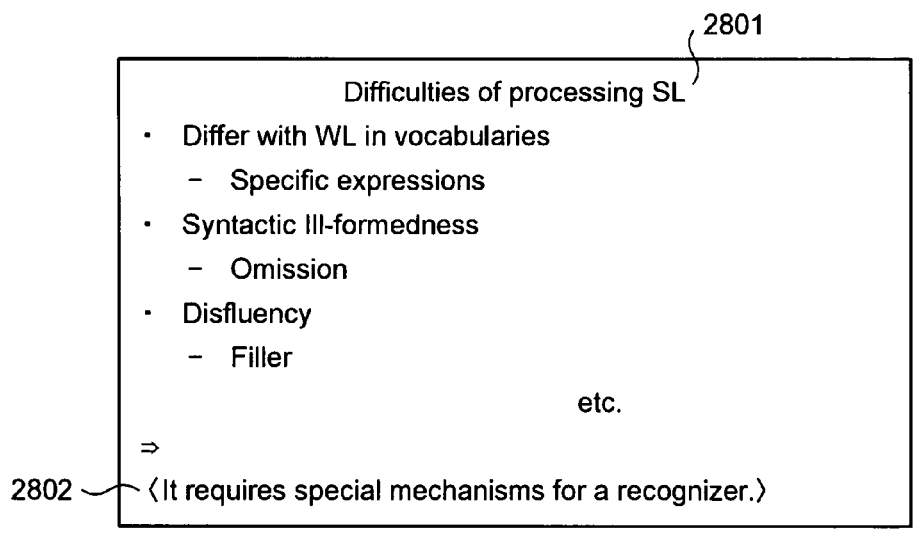
FIG. 28 is an explanatory diagram showing an example of display content of a source-language document.

The above process is repeatedly performed, and consequently the source-language document Ds that indicates a portion in which the ambiguity occurs is displayed as shown in FIG. 28.

In the case of the display content shown in FIG. 18, it is indicated that the ambiguity occurs in the word 1801: "<SL>". On the other hand, in the case of the display content shown in FIG. 28, angle brackets "<" and ">" are removed from the word 1801: "<SL>". Namely, the word 1801: "<SL>" is dynamically updated to a word 2801: "SL". Therefore, the speaker can dynamically recognize that an ambiguity occurs in the process of translation in the listener's terminal. Thus, the speaker can smoothly resolve the ambiguity by explaining a portion in which the ambiguity occurs.

In the intermediate state 3, the speaker's terminal receives the ambiguity table 122 for which status is an empty set, and thus a status of the ambiguity management table 222 also returns an empty set (steps S1703 to S1705). Therefore, there is no need to edit a source-language sentence included in the source-language document Ds for indicating an occurrence of the ambiguity. The source-language document Ds in which no ambiguity occurs is displayed on the display screen of the speaker's terminal.

Figure 29:
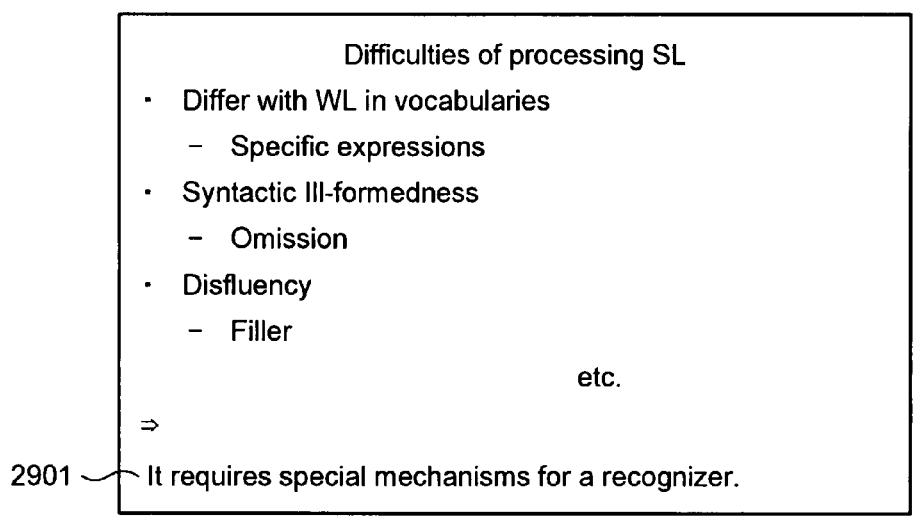
FIG. 29 is an explanatory diagram showing another example of the display content of the source-language document.

FIG. 29 is an explanatory diagram showing an example of display content of the source-language document Ds. In the intermediate state 3, the source-language document Ds without any mark for indicating an occurrence of the ambiguity is displayed as shown in FIG. 29.

In the case of the display content shown in FIG. 28, an ambiguity occurs in a sentence 2802: "<It requires special mechanisms for a recognizer.>" as indicated by angle brackets "<" and ">". On the other hand, in the case of the display content shown in FIG. 29, angle brackets "<" and ">" are removed from the sentence 2802. Namely, the sentence 2802 is dynamically updated to a sentence 2901: "It requires special mechanisms for a recognizer.". Therefore, the speaker can dynamically recognize that the ambiguity occurred in the process of translation in the listener's terminal is resolved by the speaker's speech.

As described above, when a translation ambiguity occurs in a conference material, the machine translation apparatus 1300 according to the second embodiment can indicate a portion in which the ambiguity occurs so that the speaker can recognize that the portion is to be explained. Therefore, the speaker can share the interpretive problem occurred in a translated material to which a listener refers, and thus the speaker can explain the portion to resolve the ambiguity. Furthermore, when the ambiguity is resolved by the speaker's speech, information on the speech can be dynamically updated so that it is possible to resolve the variance between a speaker's intention and the listener's understanding.

In the first and second embodiments, a source-language document or a translated document is displayed on a display screen of the machine translation apparatus. Alternatively, the machine translation apparatus can convert the source-language document or the translated document into a synthesized speech and output the synthesized speech. In this case, a portion in which an ambiguity occurs is output, for example, by changing a speech attribute such as a different tone or volume, so that a user can recognize that the ambiguity occurs in the portion.

A hardware configuration of the machine translation apparatus according to the first or second embodiment is described below with reference to FIG. 30.

Figure 30:
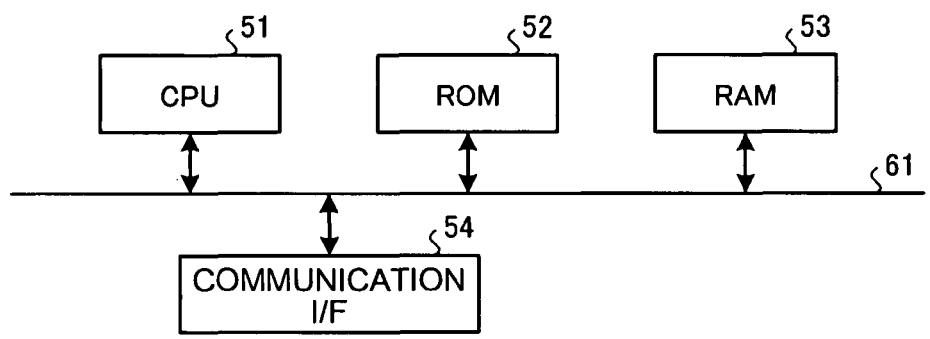
FIG. 30 is a block diagram for explaining a hardware configuration of the machine translation apparatus according to the first or second embodiment.

As shown in FIG. 30, the machine translation apparatus includes a central processing unit (CPU) 51 as a control device, a read-only memory (ROM) 52 and a random access memory (RAM) 53 as a storage device, a communication interface (I/F) 54, and a bus 61. The CPU 51, the ROM 52, the RAM 53, and the communication I/F 54 are connected to the bus 61. The communication I/F 54 is further connected to a network and communicates across the network.

A machine translation program executed by the machine translation apparatus is prestored, for example, on the ROM 52.

Alternatively, the machine translation program can be recorded in installable or executable format on a computer-readable recording medium such as a compact disk read-only memory (CD-ROM), a flexible disk (FD), a compact disk recordable (CD-R), and a digital versatile disk (DVD).

It is also possible to store the machine translation program in a computer connected to a network such as the Internet and download the machine translation program via the network. Moreover, it is also possible to provide or distribute the machine translation program via the network.

The machine translation program is configured to include the document receiving unit, the translation control unit, the translating unit, the update unit, the speech recognizing unit, the speech receiving unit, the display control unit, and the speech-output control unit, in a modular configuration. In actual hardware, the CPU 51 reads out the machine translation program from the ROM 52 and executes the machine translation program, and then each of the above units in loaded on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A machine translation apparatus comprising:
   a document receiving unit configured to receive an input of a source language document described in a source language;
   a first translating unit configured to translate the source language document into a translated document described in a target language in a first translation process, and to identify a document ambiguous portion that is a word or a sentence, for which a plurality of candidate translations occurs during the first translation process;
   a storing unit configured to store the translated document and the document ambiguous portion;
   a speech receiving unit configured to receive a speech in the source language;
   a recognition unit configured to recognize the speech received by the speech receiving unit and to create text of a source language speech sentence as a recognition result;
   a second translating unit configured to translate the text of the source language speech sentence into the target language;
   an extracting unit configured to extract a source language document sentence relating to the source language speech sentence from the source language document;
   an updating unit configured to:
      select, when the extracted source language document sentence includes the document ambiguous portion, a translated portion of the source language speech sentence corresponding to the document ambiguous portion of the extracted source language document sentence, the translated portion of the source language speech sentence being obtained by a type of ambiguity identification that is the same type of ambiguity identification as was used in the first translation process that identified the document ambiguous portion;
      retranslate the source language document using the selected translated portion of the source language speech sentence, and the extracted source language document sentence relating to the source language speech sentence; and
      update the translated document stored in the storing unit using the retranslated source language document; and
   a display control unit configured to display the updated translated document on a display unit.

2. The apparatus according to claim 1, wherein the extracting unit:
   divides the source language document into source language document sentences;
   associates a word included in the each source language document sentence with a word included in the source language speech sentence;
   calculates each first similarity between the word included in the source language document sentences and the word included in the source language speech sentence; and
   extracts one of the source language document sentences that includes a word having a maximum first similarity to the word included in the source language speech sentence.

3. The apparatus according to claim 2, wherein the extracting unit:
   calculates, with respect to each range of the source language document that includes at least one of a page, a chapter, a clause, and a paragraph, each second similarity between each of the source language document sentences contained in the range and the source language speech sentence;
   retrieves a range that includes a source language document sentence having a maximum second similarity to the source language speech sentence; and
   extracts the source language document sentence from the retrieved range.

4. The apparatus according to claim 1, wherein the extracting unit retrieves information on a range of the source language document that includes at least one of a page, a chapter, a clause, and a paragraph from the source language speech sentence, and extracts the source language document sentence from the range of the source language document.

5. The apparatus according to claim 1, wherein
   the first translating unit creates the document ambiguous portion for which a plurality of candidate translations occur during selecting a translated word in the first translation process, and
   the updating unit, when the extracted source language document sentence includes an ambiguous portion, selects a translated word selected by the second translating unit, as a translated word of the ambiguous portion, the updating unit retranslating the source language document and updating the translated document stored in the storing unit using the retranslated source language document.

6. The apparatus according to claim 1, wherein
   the first translating unit creates the document ambiguous portion for which a plurality of candidate translations occur during selecting a dependency of a word in the first translation process, and
   the updating unit, when the extracted source language document sentence includes the document an ambiguous portion selects a dependency between words of the source language speech sentence corresponding to the document ambiguous portion of the extracted source language sentence as a dependency of the document ambiguous portion, the updating unit retranslating the source language document and updating the translated document stored in the storing unit using the retranslated source language document.

7. The apparatus according to claim 1, wherein
   the display control unit displays, in association with one another, the translated document and information indicating the ambiguous portion for which the plurality of candidate translations occurs.

8. The apparatus according to claim 7, wherein
   the storing unit stores the translated document, the ambiguous portion, and type of ambiguity identification that was used in the first translation process that created the document ambiguous portion, and
   the display control unit further displays, in association with one another, the ambiguous portion of the translated document and the type of ambiguity identification.

9. A machine translation system comprising:
a display apparatus that displays a source language document described in a source language; and
a machine translation apparatus that translates the source language document into a translated document described in a target language as a translation result, and that is connected to the display apparatus via a network, wherein
the machine translation apparatus includes:
a document receiving unit that receives an input of the source language document;
a first translating unit that translates the source language document into the translated document in a first translation process and identifies a document ambiguous portion that is a word or a sentence, for which a plurality of candidate translations occurs during the first translation process;
a storing unit that stores the translated document and the document ambiguous portion;
a speech receiving unit that receives a speech in the source language;
a recognition unit that recognizes the speech received by the speech receiving unit and creates text of a source language speech sentence as a recognition result;
a second translating unit that translates the text of the source language speech sentence into a translated sentence described in the target language;
an extracting unit that extracts a source language document sentence relating to the source language speech sentence from the source language document;
an updating unit that, when the extracted source language document sentence includes the document ambiguous portion:
  selects a translated portion of the source language speech sentence corresponding to the document ambiguous portion of the extracted source language document sentence, the translated portion of the source language speech sentence being obtained by a type of ambiguity identification that is the same type of ambiguity identification as was used in the first translation process that identified the document ambiguous portion;
  retranslates the source language document using the selected translated portion of the source language speech sentence, and the extracted source language document sentence relating to the source language speech sentence; and
  updates the translated document stored in the storing unit using the retranslated source language document;
a first display control unit that displays the updated translated document on a first display unit; and
a transmitting unit that transmits the document ambiguous portion stored in the storing unit to the display apparatus, wherein
the display apparatus includes:
  a receiving unit that receives the document ambiguous portion from the machine translation apparatus; and
  a second display control unit that displays the source language document on a second display unit, the source language document including information for indicating occurrence of the document ambiguous portion where the ambiguity occurs based on the document ambiguous portion received by the receiving unit.

10. A machine translation method comprising:
receiving, by a document receiving unit configured to receive, an input of a source language document described in a source language;
first-translating, by a first translating unit configured to translate, the source language document into a translated document described in a target language in a first translation process, and identifying a document an ambiguous portion that is a word or a sentence, for which a plurality of candidate translations occurs during the first translation process;
storing, by a storing unit configured to store, the translated document and the document ambiguous portion in the storing unit;
receiving, by a speech receiving unit configured to receive, a speech in the source language;
recognizing, by a recognition unit configured to recognize, the speech and creating text of a source language speech sentence as a recognition result;
second-translating, by a second translating unit configured to translate, the text of the source language speech sentence into a translated document sentence described in the target language;
extracting, by an extracting unit configured to extract, a source language document sentence relating to the source language speech sentence from the source language document;
selecting a translated portion of the source language speech sentence corresponding to the document ambiguous portion of the extracted source language document sentence, the translated portion of the source language speech sentence being obtained by a type of ambiguity identification that is the same as the type of ambiguity identification as was used in first translation process that identified the document ambiguous portion;
retranslating the source language document using the selected translated portion of the source language speech sentence, and the extracted source language document sentence relating to the source language speech sentence;
updating the translated document stored in the storing unit using the retranslated source language document; and
displaying, by a display control unit configured to display, the updated translated document on a display unit.

11. A computer program product having a non-transitory computer readable medium including programmed instructions for machine translation, wherein the instructions, when executed by a computer, cause the computer to perform:
receiving an input of a source language document described in a source language;
first-translating the source language document into a translated document described in a target language in a first translation process, and identifying a document ambiguous portion that is a word or a sentence, for which a plurality of candidate translations occurs during the first translation process;
storing the translated document and the document ambiguous portion in a storing unit;
receiving a speech in the source language;
recognizing the speech and creating text of a source language speech sentence as a recognition result;
second-translating the text of the source language speech sentence into a translated sentence described in the target language;
extracting a source language document sentence relating to the source language speech sentence from the source language document;

selecting a translated portion of the source language speech sentence corresponding to the document ambiguous portion of the extracted source language document sentence, the translated portion of the source language speech sentence being obtained by a type of ambiguity identification that is the same type of ambiguity identification as was used in the first translation process that identified the document ambiguous portion;

retranslating the source language document using the selected translated portion of the source language speech sentence, and the extracted source language document sentence relating to the source language speech sentence;

updating the translated document stored in the storing unit using the obtained retranslation of the source language document; and displaying the retranslated document on a display unit.

* * * * *